(12) United States Patent
Chen et al.

(10) Patent No.: US 8,255,530 B1
(45) Date of Patent: *Aug. 28, 2012

(54) TRAFFIC MANAGEMENT IN DIGITAL SIGNAL PROCESSOR

(75) Inventors: Li-Sheng Chen, Petaluma, CA (US); Qian-Yu Tang, Petaluma, CA (US); Dziem Dinh Nguyen, Petaluma, CA (US); Huadong Shao, Rohnert Park, CA (US)

(73) Assignee: DinoChip, Inc., Petalulma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,973

(22) Filed: May 11, 2010

Related U.S. Application Data

(63) Continuation of application No. 10/708,503, filed on Mar. 8, 2004, now Pat. No. 7,716,314.

(60) Provisional application No. 60/534,035, filed on Dec. 30, 2003.

(51) Int. Cl.
*G06F 15/173* (2006.01)
*G06F 12/10* (2006.01)
*H04L 12/56* (2006.01)
*H04L 12/20* (2006.01)

(52) U.S. Cl. ......... 709/224; 711/202; 370/254; 370/392

(58) Field of Classification Search .................. None
See application file for complete search history.

(56) References Cited

U.S. PATENT DOCUMENTS

| | | | |
|---|---|---|---|
| 6,256,723 B1 * | 7/2001 | Hudson et al. ................ 712/35 |
| 6,651,099 B1 | 11/2003 | Dietz et al. |
| 6,769,033 B1 | 7/2004 | Bass et al. |
| 6,996,117 B2 | 2/2006 | Lee et al. |
| 7,099,949 B1 | 8/2006 | Vanhoof et al. |
| 7,103,008 B2 | 9/2006 | Greenblat et al. |
| 7,266,122 B1 | 9/2007 | Hogg et al. |
| 2002/0000474 A1 * | 1/2002 | Fujimura et al. .............. 235/492 |
| 2002/0049841 A1 | 4/2002 | Johnson et al. |
| 2003/0018760 A1 | 1/2003 | Putzolu et al. |
| 2003/0152084 A1 * | 8/2003 | Lee et al. ................. 370/395.21 |
| 2004/0062233 A1 | 4/2004 | Brown |

OTHER PUBLICATIONS

MSC8101 Data Sheet.

* cited by examiner

*Primary Examiner* — Wen-Tai Lin
(74) *Attorney, Agent, or Firm* — Aka Chan LLP

(57) ABSTRACT

Network traffic is manages using a digital signal processing integrated circuit (DSP). The DSP performs one or more of the following functions on the incoming network traffic: classification, policing, congestion control, segmentation and reassembly, queuing, scheduling, shaping and label switching. The DSP may have one or a plurality of processing cores. In one embodiment of the invention, each processing core of the DSP is dedicated to specific traffic management layer. The DSP, used in management of network traffic, provides quality of service (QoS) or class of service (CoS) control.

8 Claims, 22 Drawing Sheets

TRAFFIC MANAGEMENT IN DIGITAL SIGNAL PROCESSOR

CROSS-REFERENCE TO RELATED APPLICATIONS

This application is a continuation of U.S. patent application Ser. No. 10/708,503, filed Mar. 8, 2004, issued as U.S. Pat. No. 7,716,314 on May 11, 2010, which claims priority to U.S. provisional patent application No. 60/534,035, filed Dec. 30, 2003, entitled "Traffic Management in Digital Signal Processor," which are incorporated by reference, along with all references cited in this application.

BACKGROUND OF THE INVENTION

The present invention relates generally to the field of computer and data networking, and more particularly, to methods and techniques to more efficiently process the data packets of a network using a digital signal processing integrated circuit (DSP).

Computer networking is one of the most important technologies in the information age. Personal computers are on the desks of most business people and majority of homes in the United States, and also becoming more commonplace throughout the world. Computers are instrumental for facilitating electronic commerce and internet traffic. Computers are typically connected using a network that allows the sharing or transfer of data between computers and devices. This data may include computer files, e-mail, images, audio, video, real-time data, and other types of information. For example, when their computers are joined in a network, people can share files and peripherals such as modems, printers, tape backup drives, or CD-ROM drives. When networks at multiple locations are connected, people can send e-mail, share links to the global internet, or conduct videoconferences in real time with other remote users. Local area network (LANs) are used to connect computers within businesses and homes. The internet is typically used to connect individual computers and other networks, including local area networks.

Each computer has a set of predefined network ports, which act as mailboxes for incoming and outgoing messages. The ports are typically configured to support a particular network protocol, and hence to receive or send a type of packet that is compatible with the protocol. For example, one common port is the UDP (user datagram protocol) port, which provides a channel into the computer for datagram packets that are communicated using TCP/IP (transport control protocol/internet protocol). Datagram packets are sent to a specific UDP port by using a programming interface, such as "sockets." Sockets are a programming interface originated on Unix operating systems that allows network communication using a file I/O metaphor.

Despite the success of computer networks, there is continuing development to improve networking technology, especially since network traffic continues to rapidly grow. For example, it is desirable to increase transmission speed and network processing speed. This will allow more users to transfer greater amounts of data. Faster processing will allow better and faster filtering of network traffic so that, for example, selected users will receive better response times. Further, it is important to improve security on networks, which has become a high priority. Better and faster network processing will allow improved filtering to prevent security breaches and transmission of computer viruses.

DSPs are the building blocks of many electronic devices and networks. Some types of DSP include Texas Instruments TMS32OC64xx, Analog Devices ADSP-T520x5, and Motorola MSC8 102. Typically DSPs are used to process specialized data such as graphics, video, and audio. However, DSPs have not been used or even considered for use in the management of traffic over a network.

As can be appreciated, there is a need for improvements in computer networking, especially for techniques to improve processing and speed of processing networking information.

BRIEF SUMMARY OF THE INVENTION

The invention is a technique of using a digital signal processor (DSP) to manage traffic over a network. Some traffic management functions include classifying, policing, queuing, shaping, controlling congestion, SARing (segmentation and reassembly), scheduling, and label switching. Each of these functions may be implemented using a DSP. A traffic manager may include any number or combination of these traffic management functions.

Further, some specific sorting techniques for traffic management are described in U.S. patent application Ser. No. 10/125,686, filed Apr. 17, 2002, issued as U.S. Pat. No. 7,284,111 on Oct. 16, 2007, entitled "Integrated Multidimensional Sorter," and U.S. patent application Ser. No. 10/737,461, filed Dec. 15, 2003, issued as U.S. Pat. No. 7,362,765 on Apr. 22, 2008, entitled "Network Traffic Management System with Floating Point Sorter," which are both incorporated by reference. The subject matter in these patent applications may be performed using a DSP.

The DSP may be a single chip integrated circuit having one or more cores. With a multiple core DSP, each core may be assigned to a specific, different traffic management function, or each core may be used to pipeline a one traffic management function.

In an implementation, the invention is the use of a DSP in a line card for a network box, where the DSP handles traffic management. Each network box has a number of line cards. Furthermore, a traffic manager chip (not a DSP) on existing line cards in network boxes may be removed and a DSP with traffic management functions of the invention may be substituted in its place. This traffic management chip may be an application specific integrated circuit (ASIC). This replacement of the traffic management chip will lower the cost and power consumption of each line card, because a DSP is less expensive and consumes less power than an ASIC.

In another implementation, the invention is a method of managing traffic over a network including receiving in-coming traffic from the network in a DSP having at least 128K bytes of on-chip memory. A policing function is performed on the incoming traffic to the DSP in a first core of the DSP. A congestion control function is performed in a second core of the DSP, where the second core processes data generated by the first core. A scheduling function is performed in a third core of the DSP, where the third core processes data generated by the second core. A shaping function is performed in a fourth core of the DSP, where the fourth core processes data generated by the third core.

In another implementation, the invention is a method of managing traffic over a network including receiving incoming traffic from the network in a DSP having at least 128K bytes of on-chip memory. A first traffic management function is performed on the incoming traffic to the DSP in a first core of the DSP. A second traffic management function is performed in a second core of the DSP, where the second core processes data generated by the first core.

In another implementation, the invention is a method of managing traffic over a network including receiving incoming traffic from the network in a DSP having at least 128K bytes of on-chip memory. A first portion a traffic management function is performed on the incoming traffic to the DSP in a first core of the DSP. A second portion the traffic management function is performed on the incoming traffic to the DSP in a second core of the DSP. The first and second portions of the traffic management function are performed in parallel by the first and second cores of the DSP.

In another implementation, the invention is a system having a DSP having at least 128K bytes of on-chip memory, where the DSP receives a first flow and a second flow of incoming traffic over a network, and the DSP determines whether the first flow or second flow is next to be processed.

In another implementation, the invention is a system having a network processor receiving incoming flows from a network and a DSP, connected to the network processor. The digital signal processing integrated circuit has at least 128K bytes of on-chip memory, where the DSP receives a first flow and a second flow of incoming traffic from the network processor, and the DSP communicates to the network processor which of the first flow or second flow is to be processed next.

Other objects, features, and advantages of the present invention will become apparent upon consideration of the following detailed description and the accompanying drawings, in which like reference designations represent like features throughout the figures.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
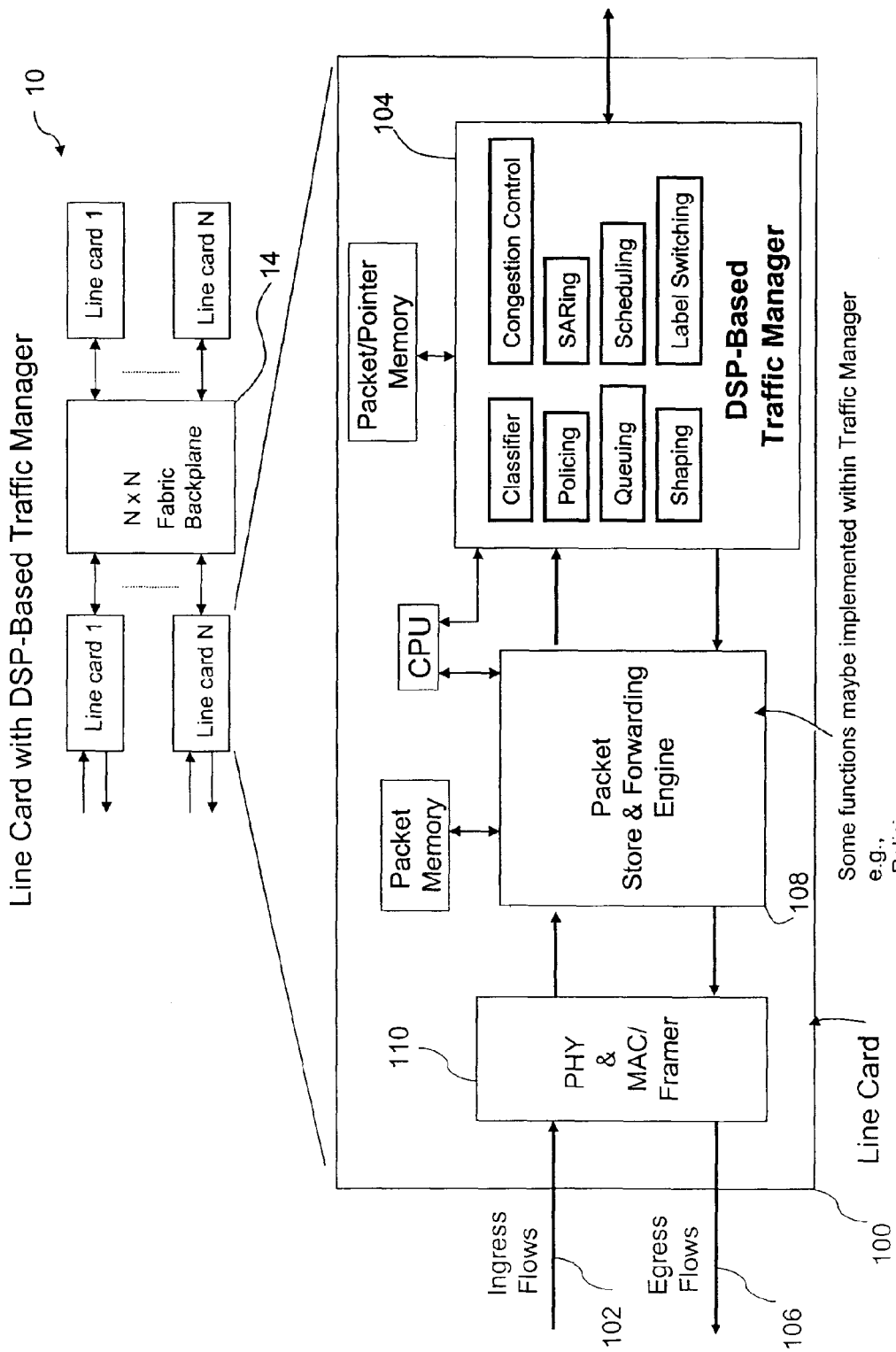
FIG. 1 shows a network box and a network line card of the network box within which the present invention may be embodied.

In accordance with an embodiment of the invention, FIG. 1 illustrates a network box 10, which includes a number of network line cards and a fabric backplane 14, to manage traffic over a network. This network may be wired, wireless, optical, or may be any combination of these. The network may be relatively large, such as the internet, or smaller, such as between multiple offices of a business. The network may be public or private, encrypted or unencrypted, and use any networking protocol. For example, the traffic may be voice over IP. Fabric backplane 14 is a circuit board containing circuitry into which a number of network line cards, or other cards, can be plugged. A network line card may communicate with other network line cards, or other cards, connected to the fabric backplane 14. The backplane may include sockets or connectors in which the line cards may be removed or inserted. Network box 10 may manage traffic over a network using one or a number of network line cards.

As further detailed in FIG. 1, network line card 100 of network box 10 includes DSP 104, where the DSP 104 provides traffic management functions. Traffic management functions include classifying, policing, queuing, shaping, controlling congestion, SARing (segmentation and reassembly), scheduling, and label switching. Each of these functions may be implemented by DSP 104. A traffic manager may include any number or combination of these traffic management functions, and may include additional functions.

Network line card 100 receives incoming traffic 102, or ingress flows, and outputs outgoing traffic 106, or egress flows. Incoming traffic 102 and outgoing traffic 106 may be received and transmitted, respectively, as variable-length packets of data (e.g., digital bits) or fixed-length cells in accordance with any of a number of protocols, including asynchronous transfer mode (ATM), Ethernet, internet protocol version 4 (IPv4), internet protocol version 6 (IPv6), multiprotocol label switching (MPLS), point-to-point protocol (PPP), differentiated services (DiffServ), or voice over internet protocol (VoIP). Framer 110 is circuitry that ensures the serial bit-by-bit data of the incoming traffic 102 and outgoing traffic 106 are received and transmitted as complete units, or packets, with addressing and necessary protocol control information. Framer 110 is connected to a Packet Store and Forwarding Engine 108. Packet Store and Forwarding Engine 108 classifies each incoming data packet with a unique flow identification number (flow ID) and segments the incoming data packets into fixed size cells. The fixed size cells of incoming data are next transmitted to DSP 104 for traffic management processing. In an alternative embodiment, DSP 104 may perform one or more of the functions of Packet Store and Forwarding Engine 108.

In an embodiment according to the present invention, DSP 104 can be implemented by single or multicore DSPs, including without limitation, Texas Instruments TMS32OC64xx, Analog Devices ADSP-T520x5, and Motorola MSC8 102. These digital signal processors, and others, can perform one or more of the traffic management functions.

For example, as traffic manager, DSP 104 may include any number or combination of the following traffic management functions:

Classifier: classifier differentiates incoming packets, and splits them into one or more logical flows. Classification can be based on a number of factors, including source type (e.g., video, audio, or data), bandwidth requirements (e.g., higher bandwidth for video transmission), or customer type (e.g., "premium" customer). For example, the classifier may classify incoming packets from a "premium" customer, such as a high volume customer at an on-line brokerage, with a higher priority than other customers. Then, that "premium" customer may be connected to a higher speed server.

Policing: policing ensures a flow does not use more bandwidth than it has been allocated in its service-level agreement (SLA). The policing function tracks the current allocation of traffic and interprets new requests to traffic in light of the policies and current allocation.

Congestion Control: congestion control prevents traffic congestion by discarding traffic that falls outside a committed profile. For example, if a customer exceeds his allocated queue length threshold, for example, 64K bytes, the customer's data packets or cells are dropped.

SARing (Segmentation and Reassembly): SARing segments packet into fixed data units (cells) and reassemble cells to packet (e.g., one 1500 Ethernet payload can be segmented to 32 ATM cells).

Queuing: queuing segregates incoming traffic into a plurality of individual connections (for example, 10,000, 50,000, 100,000, or more individual connections) based on their destination address or priority.

Scheduling: scheduling determines the departure time and ordering of packets. The scheduling function of traffic management may be based one or a combination of scheduling techniques, including without limitation, priority queuing (PQ), first in first out (FIFO) queuing, class based queuing (CBQ), round robin (RR), waiting round robin (WRR), earliest deadline first (EDF), weighted fair queue (WFQ), deficit round robin (DRR), or modified deficit round robin (MDRR).

Shaping: shaping regulates outgoing traffic to comply with SLAs and helps to deal with bursty traffic. Traffic shaping delays cells or packets within a traffic stream or, if there is insufficient buffer space to hold the delayed data cells or packets, drops data cells or packets.

Label Switching: label switching swaps the flow ID or tag into network specified label. In multi-protocol label switching systems (MPLS), labels are attached to packets, which help MPLS nodes forward the packet across a label switched path. The label determines the path a packet will traverse. For example, a path can be created that provides high bandwidth and low delay as a premium service for customers. Paths can be designed using manual or automatic techniques. MPLS supports explicit routing, in which the paths across a network are specified, and constraint-based routing, in which the path is selected based on parameters as a packet traverses the network.

As an embodiment of the present invention, a network management system can include a backplane; a first card, connected to the backplane, having a first digital signal processor integrated circuit to process packet flows of the network management system directed to the first card; and a second card, connected to the backplane, having a second digital signal processor integrated circuit to process packet flows of the network management system directed to the second card. The backplane provides a communication path between the first and second card.

Figure 2:
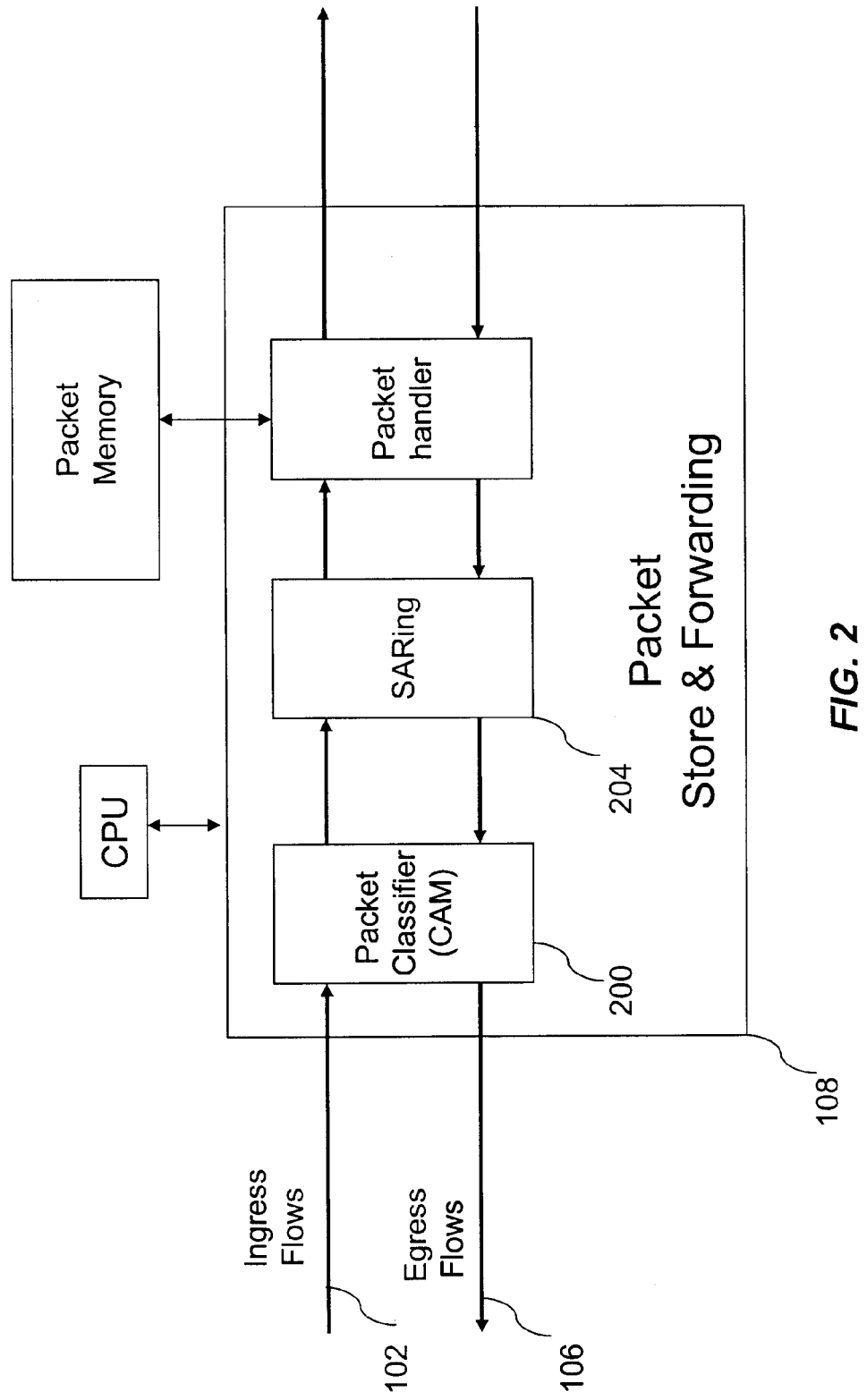
FIG. 2 shows a packet store and forwarding engine of a network line card according to one embodiment of the invention.

FIG. 2 shows functional details of the Packet Store and Forwarding Engine 108. Packet Store and Forwarding Engine 108 provides classifier or content addressable memory and SARing.

Figure 3:
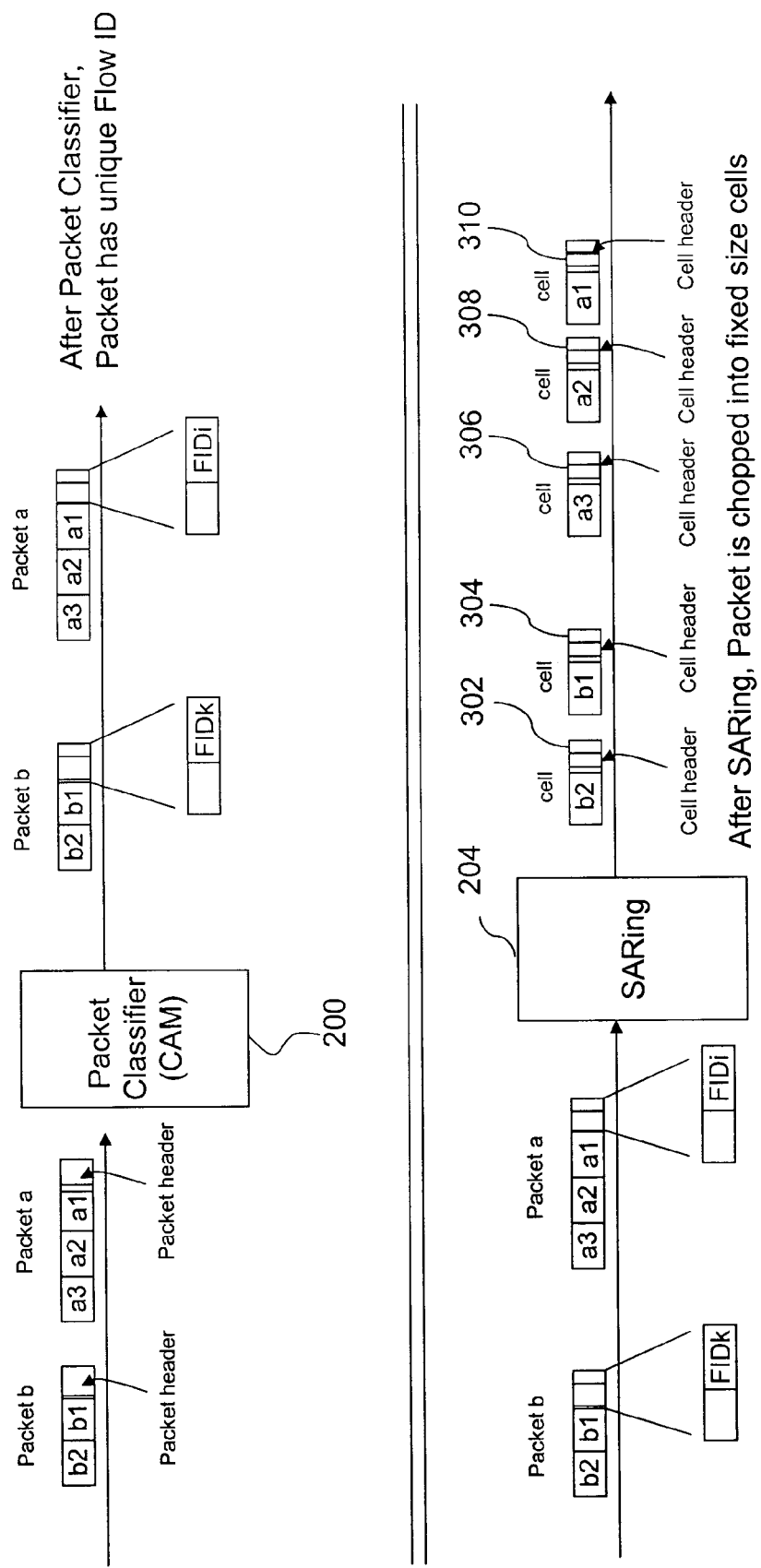
FIG. 3 shows a packet classifier and segmentation and reassembly.

As an example, FIG. 3 shows packet classifier 200 adding unique flow ID number FIDk to the header of data packet b and unique flow ID number FIDi to the header of data packet a1. Next, segmentation and reassembly 204 segments packet b into fixed size data cells 302 and 304, and segments packet a into fixed size data cells 306, 308, and 310. The headers to data cells 302 and 304 include flow ID number FIDk. Likewise, the headers to data cells 306, 308, and 310 include flow ID number FIDi.

Briefly described below are several examples of DSP architectures that may be used in implementing a traffic manager of the invention. These DSPs are discussed primarily to describe various aspects of the invention. However, there are other DSPs that may be used according to the principles of the invention and any of these may also be used.

Figure 4:
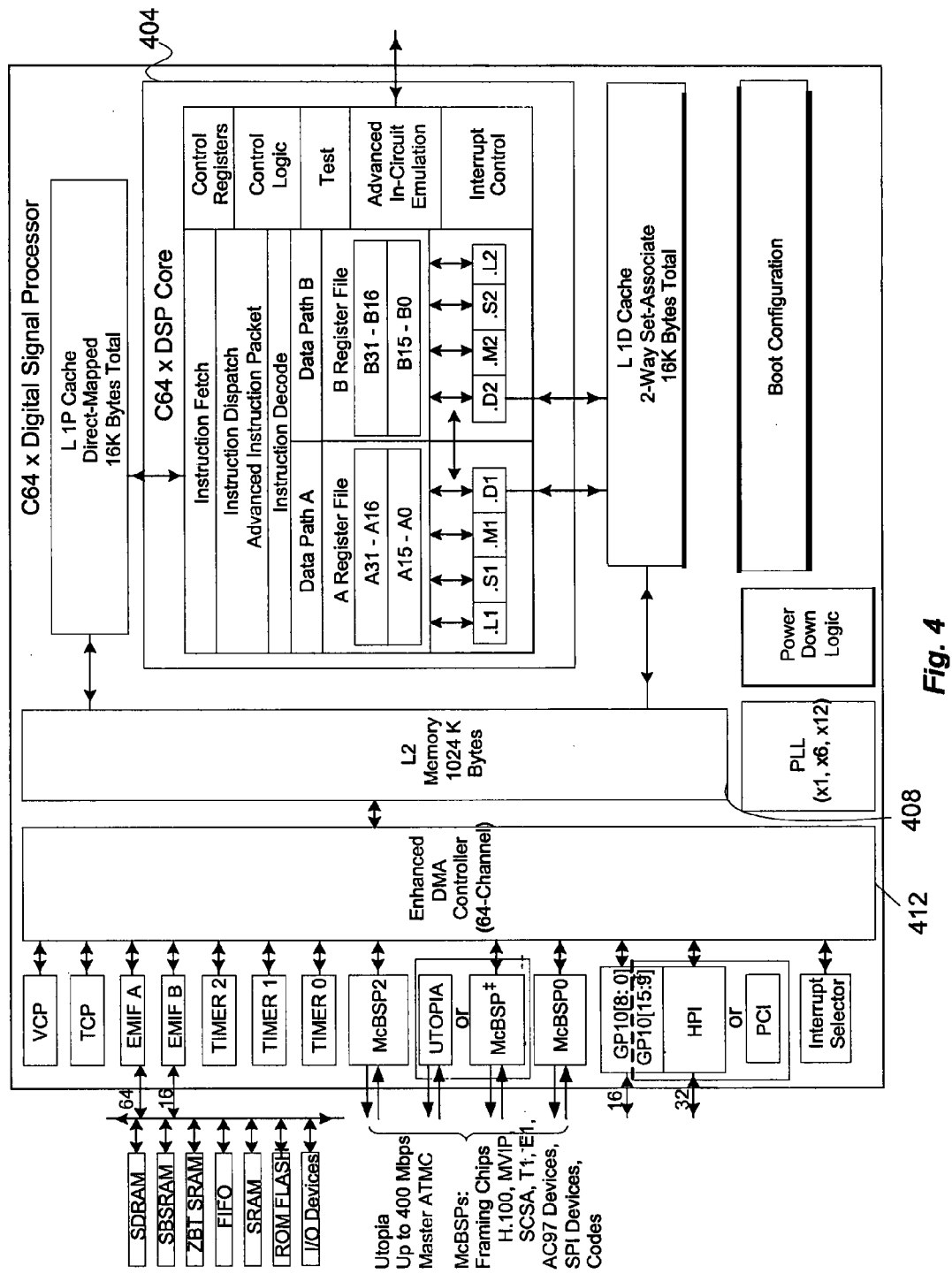
FIG. 4 shows, as an example, a block diagram of a single core DSP, Texas Instruments TMS32OC64xx.

FIG. 4 shows, as an example, a block diagram of a single core DSP, Texas Instruments TMS32OC64xx. The TMS32OC64xx contains, among other things, a core 404, cache 408, DMA controller 412, and three timers. Cache 408 includes four memory banks totaling 1024K bytes of memory. Each bank has 256K of memory. The instruction set for the TMS32OC64xx has numerous instructions including NORM and LMBD. The instruction NORM calculates the number of redundant zero bits from left to right, excluding the sign bit. The instruction LMBD finds the first nonzero bit from left to right. In an embodiment of the invention, the NORM instruction or LMBD instruction are used to determine the highest class of service (CoS) for traffic management. Typically, an instruction of the DSP is a single instruction that operates on bits or data stored in a register or memory location. Some instructions may complete their operation in a single clock cycle, and other instructions may complete their operation in a number of clock cycles. Compared to a typical microprocessor, a DSP has a very long instruction word, which means many operations may occur in parallel, allowing a DSP instruction to operate more quickly.

Figure 5:
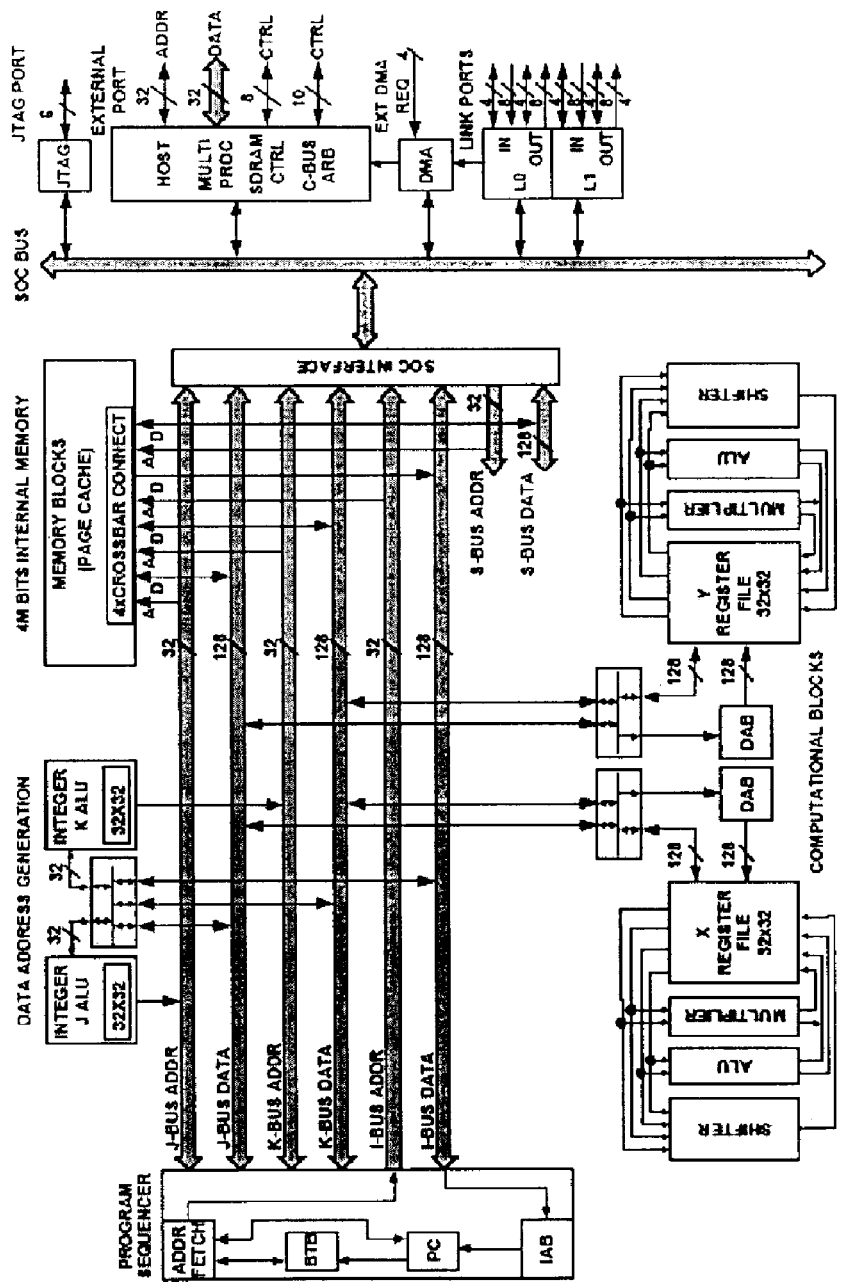
FIG. 5 shows, as an example, a block diagram of a single core DSP, Analog Devices ADSP-T520x5.

FIG. 5 shows, as an example, a block diagram of a single core DSP, Analog Devices ADSP-T520x5. The ADSP-T520x5 contains dual compute blocks, four independent 128- bit wide internal data buses, and four sections of 1-megabits of internal, on-chip DRAM memory. Each of the four independent 128-bit wide internal data buses connects to the four 1-megabits of on-chip DRAM memory. The dual compute blocks each comprise an arithmetic logic unit (ALU), multiplier, 64-bit shifter, 32-word register file and associated data alignment buffers, or quad word FIFOs. The 128-bit instruction line can contain up to four 32-bit instructions.

Figure 6:
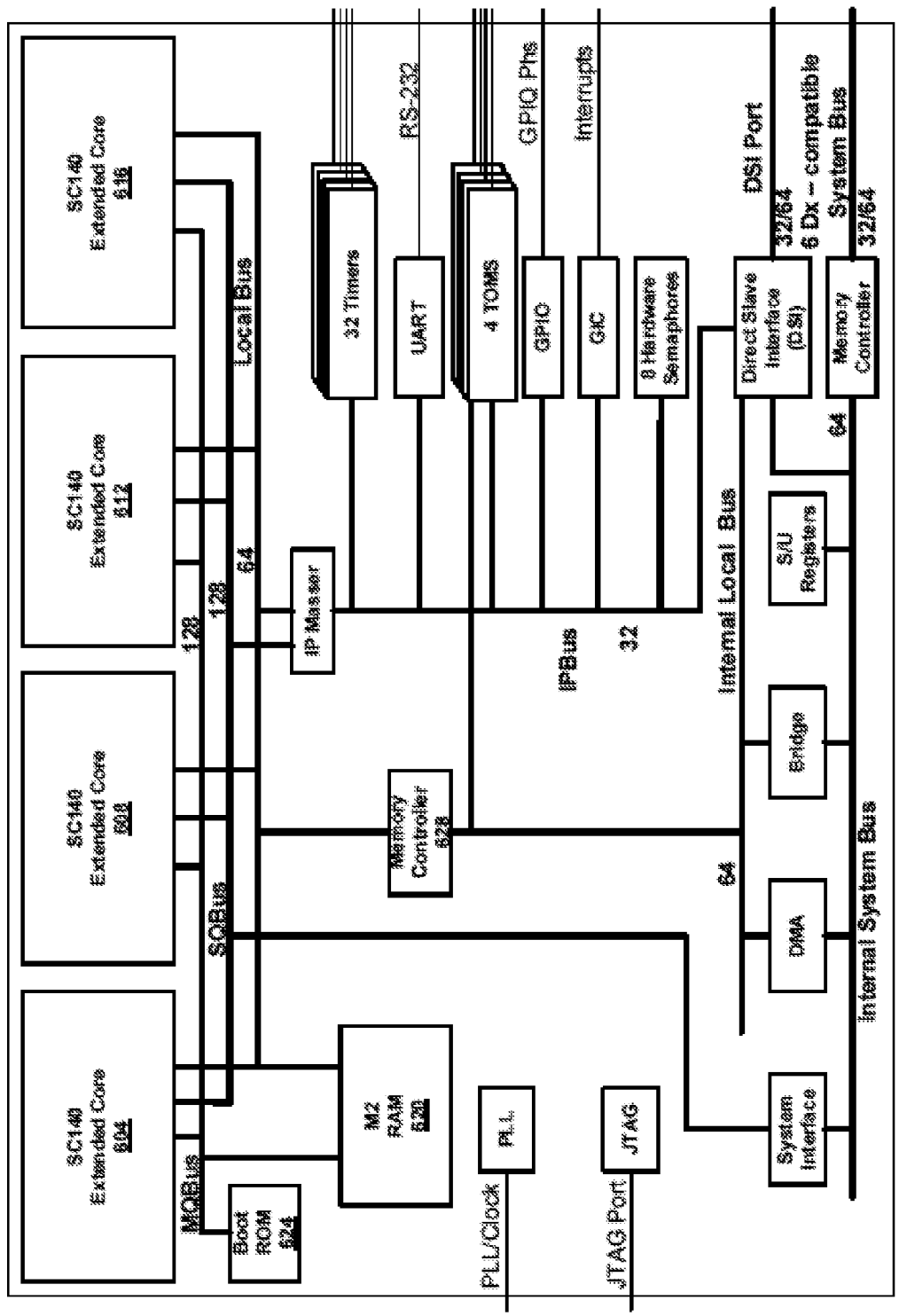
FIG. 6 shows, as an example, a block diagram of a multi-core DSP, Motorola MSC8 102.

FIG. 6 shows, as an example, a block diagram of a multicore DSP, the Motorola MSC8 102. Each core 604, 608, 612, and 616 is connected to on-chip memory 620 and boot ROM 624. Memory controller 628 controls access to both a local bus and a system bus. This DSP also has thirty-two general purposes timers. Each core has four ALUs. On-chip memory 620 includes 1436K bytes of memory. The instruction set of the MSC8 102 has numerous instructions including a CLB instruction. The instruction CLB uses a fix value, nine, to subtract the number of consecutive zero bits from the most significant bit (e.g., bit 39). In an embodiment of the invention, the CLB instruction is used to determine the highest CoS for traffic management.

In alternative embodiments, the traffic manager may be implemented using a PLD or field programmable gate array (FPGA) or ASIC, or a custom-designed integrated circuit, rather than a DSP. But, in a specific embodiment, a traffic manager is implemented with a DSP integrated circuit dedicated to digital signal processing, which does not include a FPGA or ASIC chip with some DSP functions. A dedicated DSP-based traffic manager provides advantages over embodiments using a FPGA or ASIC chip, including lower power consumption, lower heat generation, lower cost, long instruction word, smaller package size, specific instruction set, and scalability of CoS register. For example, with respect to the long instruction word and specific instruction set, Texas Instruments TMS32OC64xx requires one clock cycle to complete the NORM instruction on a 32 bit register. A FPGA or ASIC implementation may require more clock cycles to complete an equivalent operation. Lower power consumption by a DSP-based traffic manager may allow battery operation, and lower heat generation may result in less or no special cooling requirements in the network box.

Figure 7:
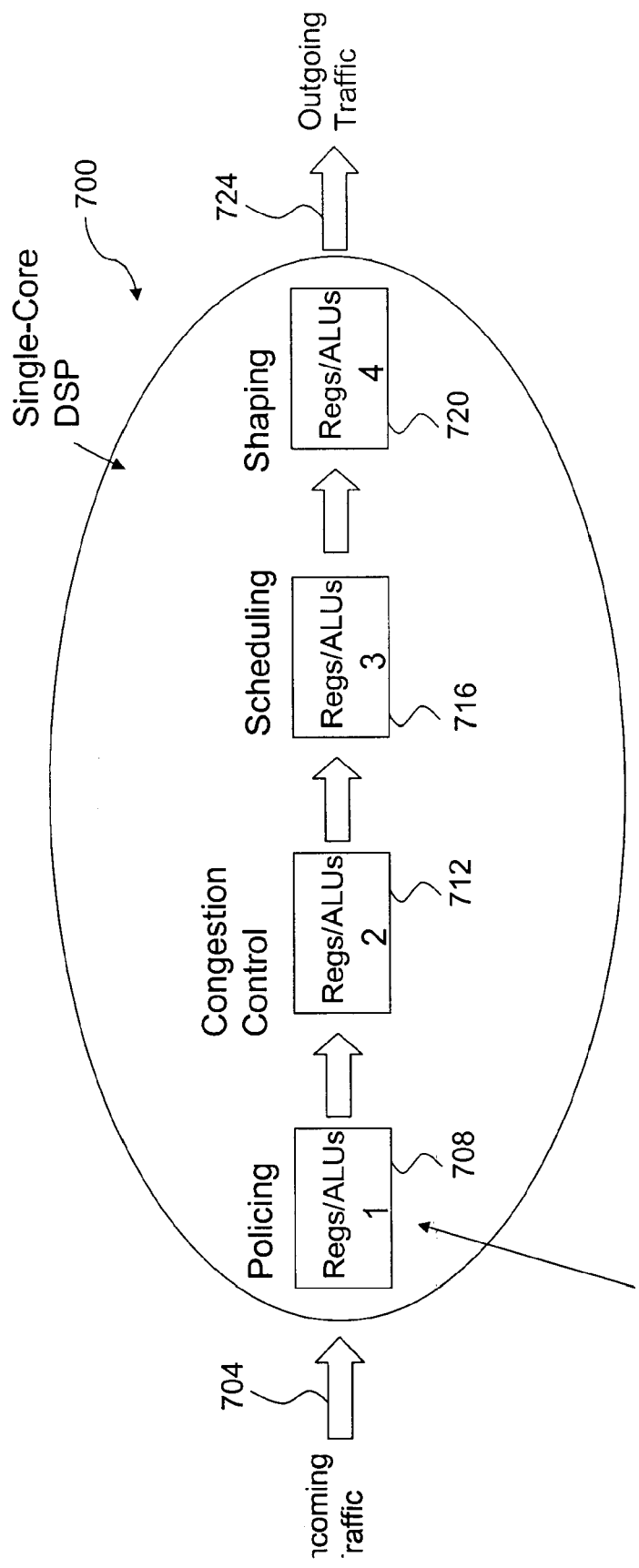
FIG. 7 shows implementation of the traffic management functions in a single core DSP by a pipeline processing approach according to an embodiment of the invention.

In an embodiment of the invention, a single core DSP can implement traffic management functions by a pipeline, parallel, or mixed processing approach. FIG. 7 illustrates an example of an embodiment with a pipeline processing approach. Single core DSP 700 can be implemented, as an example, by Texas Instruments TMS32OC64xx or Analog Devices ADSP-T520x5, whose architectures are shown in FIGS. 4 and 5 respectively. Single core DSP 700 performs the policing, congestion control, scheduling and shaping functions of traffic management.

DSP 700 performs the policing function on incoming traffic 704 to monitor the traffic and ensure, for example, that the incoming flow does not use more bandwidth than it has been allocated. The policing function is implemented by a first set 708 of on-chip registers or ALU, or both. The incoming data cells and a conforming indicator (e.g., cell loss priority (CLP) =1 for nonconforming cells, CLP=0 for conforming cells) are provided to a second set 712 of on-chip registers or ALU, or both. This second set 712 performs the congestion control function for DSP 700. In the congestion event, the congestion control function discards the nonconforming cells (e.g., CLP=1). Otherwise, the data cells are sent to a third set 716 of registers or ALU, or both. This third set 716 performs the scheduling function to determine which data cells are to be given priority, or outputted first. Third set 716 outputs prioritized data cells to a fourth set 720 of registers or ALU, or both.

The fourth set 720 performs the shaping function, and thus may delay the output of data cells to output traffic 724 or, if there is insufficient buffer space to hold the delayed cells, drop cells.

By allocating each set of on-chip registers or ALU, or both, with a particular traffic management function, this permits the pipeline of operations on a data stream. For example, sets of on-chip registers or ALU, or both, 708, 712, 716, and 720 may be operating at the same time on different packets to speed up processing. For instance, at a cell time T, set 708 performs policing on a packet A, set 712 performs congestion control on a packet B, set 716 performs scheduling on a packet C, and set 720 performs shaping on a packet D. At cell time T+1, set 708 performs policing on a packet E, set 712 performs congestion control on the packet A, set 716 performs scheduling on the packet B, and set 720 performs shaping on the packet C.

Figure 8:
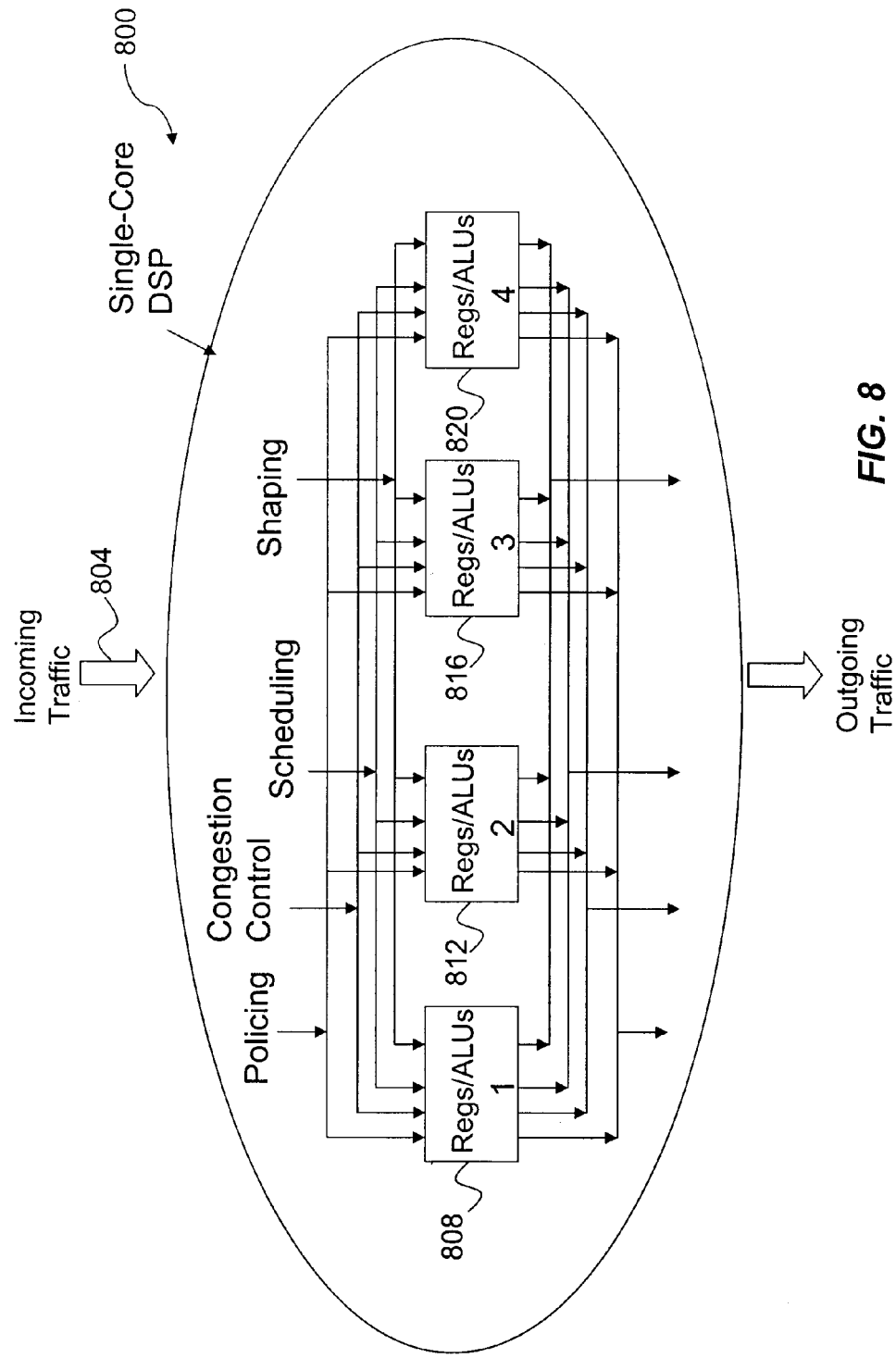
FIG. 8 shows implementation of the traffic management functions in a single core DSP by a parallel processing approach according to an embodiment of the invention.

In an embodiment of the invention, a single core DSP can implement traffic management functions by a parallel processing approach. FIG. 8 illustrates an example of this embodiment. Single core DSP 800 performs the policing, congestion control, scheduling, and shaping functions of traffic management in parallel. Each traffic manager function (i.e., policing, congestion control, scheduling, and shaping functions) is partitioned to several tasks (i.e., task 1, task 2, task 3, and task 4) and each task is inputted to one of a corresponding sets of on-chip registers or ALU, or both, 808, 812, 816, and 820. In this example, set of registers or ALU, or both, 808 performs task 1 for policing, congestion control, scheduling, and shaping functions. Set of registers or ALU, or both, 812 performs the task 2 for policing, congestion control, scheduling, and shaping functions. Set of registers or ALU, or both, 816 performs the task 3 for policing, congestion control, scheduling, and shaping functions. Set of registers or ALU, or both, 820 performs the task 4 for policing, congestion control, scheduling, and shaping functions. If all sets of on-chip registers or ALU, or both, 808, 812, 816, and 820 indicate that a data cell is to be outputted, DSP 800 outputs the data cell.

Figure 9:
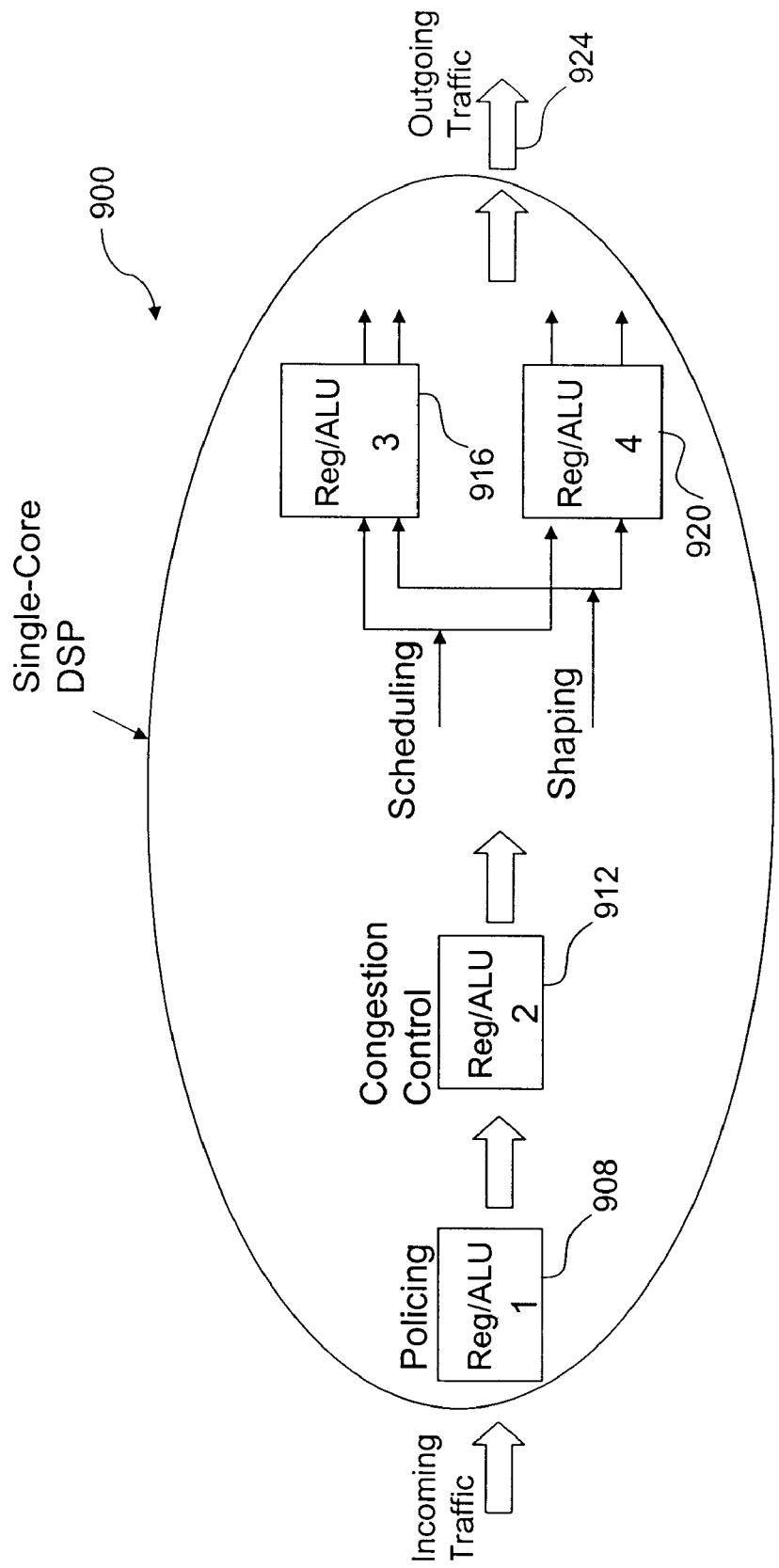
FIG. 9 shows implementation of the traffic management functions in a single core DSP by a mixed pipeline and parallel processing approach according to an embodiment of the invention.

FIG. 9 illustrates, as an alternative embodiment, an implementation of the traffic management functions in a single core DSP by a mixed pipeline and parallel processing approach. The policing function is implemented by a first set of on-chip registers or ALU, or both, 908. The incoming data cells and a conforming indicator (e.g., cell loss priority (CLP)=1 for nonconforming cells, CLP=0 for conforming cells) are provided to a second set of on-chip registers or ALU, or both, 912. This second set 912 performs the congestion control function for DSP 900. In the congestion event, the congestion control function discards the nonconforming cells (e.g., CLP=1). Otherwise, the data cells are sent to a third set of on-chip registers or ALU, or both, 916 and a fourth set of on-chip registers or ALU, or both, 920. Scheduling and shaping functions are partitioned to task 1 and task 2. In this example, set of registers or ALU, or both, 916 performs task 1 for scheduling and shaping functions. Set of registers or ALU, or both, 920 performs the task 2 for scheduling and shaping functions. If both the third set 916 and fourth set 920 indicate that a data cell is to be outputted, DSP 900 outputs the data cell.

According to an embodiment of the invention, a DSP implementing the traffic management functions may have one, two, three, four, five, six, seven, eight, or more cores. In the event of failure of a core, traffic management functions can be redistributed or switched to one or a number of the remaining cores. In embodiments of the invention with a multicore DSP, traffic management functions may be process in a pipeline, parallel or mixed processing approach. For example, FIGS. 10, 11, and 12 illustrate embodiments a four core DSP configured to process traffic management functions in a pipeline, parallel and mixed processing approach, respectively.

Figure 10:
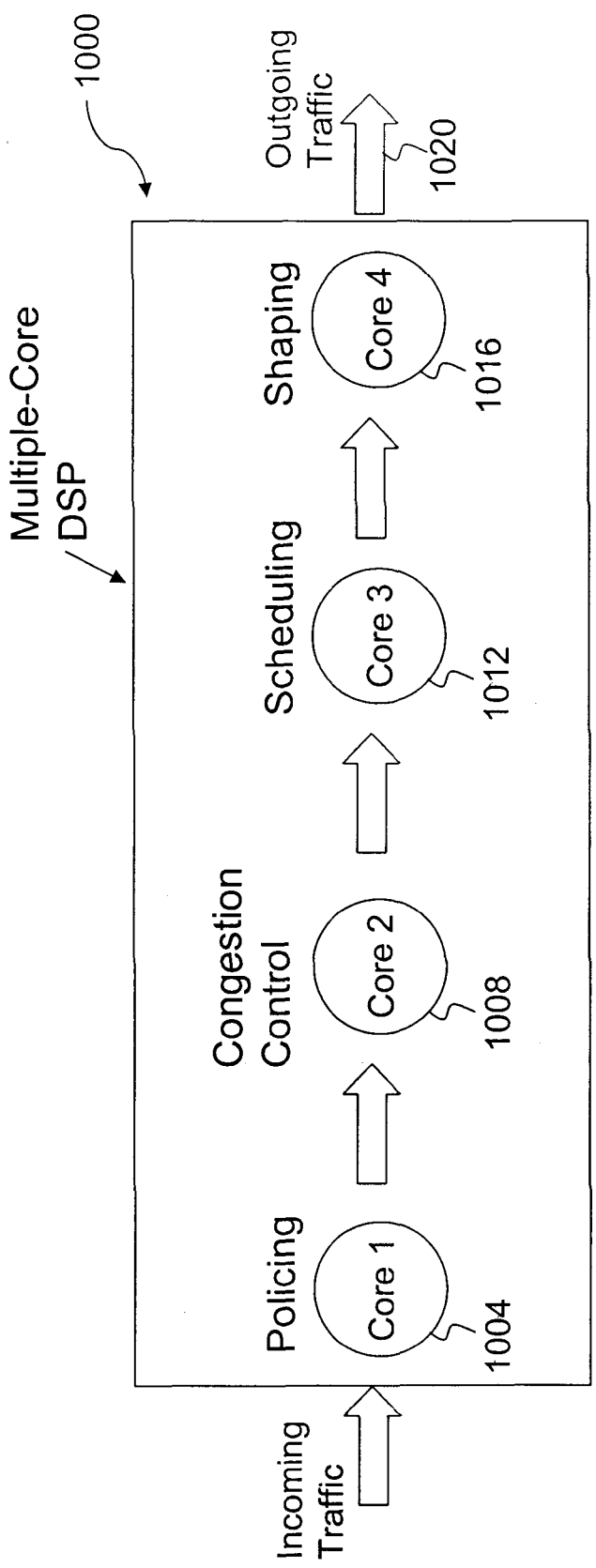
FIG. 10 shows, as an example, an implementation of the traffic management functions in a four core DSP by a pipeline processing approach according to an embodiment of the invention.

FIG. 10 shows an implementation of the traffic management functions in a four core DSP 1000 by a pipeline processing approach. DSP 1000 can be implemented, as an example, by Motorola M5C8012, whose architecture is shown in FIG. 6. In this example, core 1004 implements policing, core 1008 implements the congestion control, core 1012 implements scheduling, core 1016 implements shaping. Core 1004 outputs the incoming data cells and a conforming indicator (e.g., cell loss priority (CLP)=1 for nonconforming cells, CLP=0 for conforming cells) to core 1008. In the congestion event, core 1008 discards the nonconforming cells (e.g., CLP=1). Otherwise, data cells are outputted to core 1012, which determines data cells that are to be given priority and outputs prioritized data cells to core 1016. Core 1016 outputs the data cells to output traffic 1020, unless shaping requires a delay. In the event of a delay, core 1016 stores the delayed cells in a buffer space or, alternatively, drops cells if there is insufficient buffer space. By allocating each core, with a particular traffic management function, this permits the pipeline of operations on a data stream. For example, cores 1004, 1008, 1012, and 1016 may be operating at the same time on different packets to speed up processing. For instance, at a cell time T, core 1004 performs policing on a packet A, core 1008 performs congestion control on a packet B, core 1012 performs scheduling on a packet C, and core 1016 performs shaping on a packet D. At cell time T+1, core 1004 performs policing on a packet E, core 1008 performs congestion control on the packet A, core 1012 performs scheduling on the packet B, and core 1016 performs shaping on the packet C.

Figure 11:
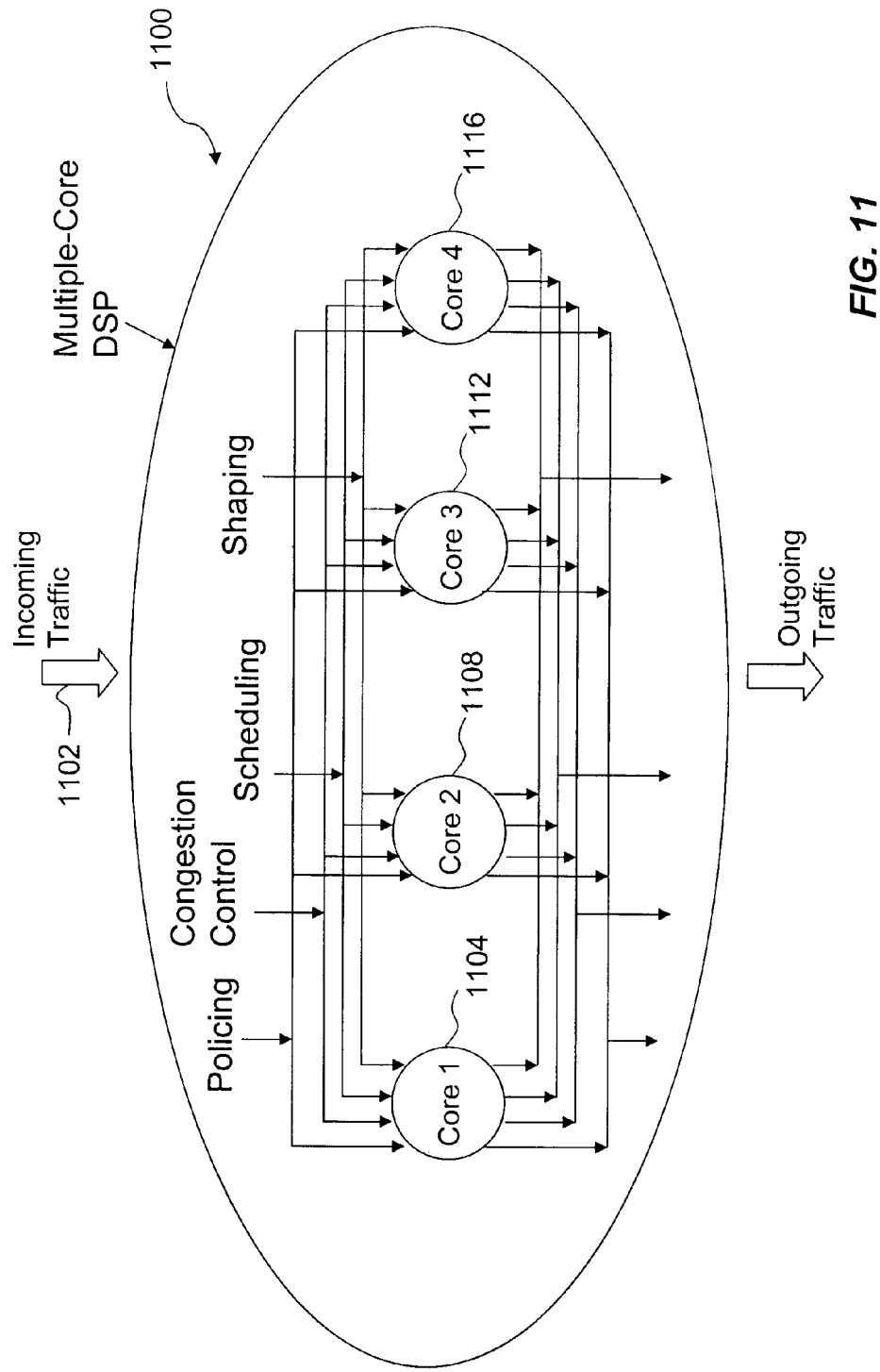
FIG. 11 shows, as an example, an implementation of the traffic management functions in a four core DSP by a parallel processing approach according to an embodiment of the invention.

According to an embodiment of the invention, FIG. 11 shows an implementation of the traffic management functions in a four core DSP 1100 by a parallel processing approach. In this example, each traffic manager function (i.e., policing, congestion control, scheduling, and shaping functions) is partitioned to several tasks (i.e., task 1, task 2, task 3, and task 4), and each task is inputted to one of core 1104, 1108, 1112, and 1116. In this example, core 1104 performs task 1 for policing, congestion control, scheduling, and shaping functions. Core 1108 performs task 2 for policing, congestion control, scheduling, and shaping functions. Core 1112 performs task 3 for policing, congestion control, scheduling, and shaping functions. Core 1116 performs task 4 for policing, congestion control, scheduling, and shaping functions. If all cores 1104, 1108, 1112, and 1116 indicate that a data cell is to be outputted, DSP 1100 outputs the data cell. A parallel processing approach allows for data streams to be handled in a shorter time, thus increasing a chip's capacity (i.e., bandwidth).

Figure 12:
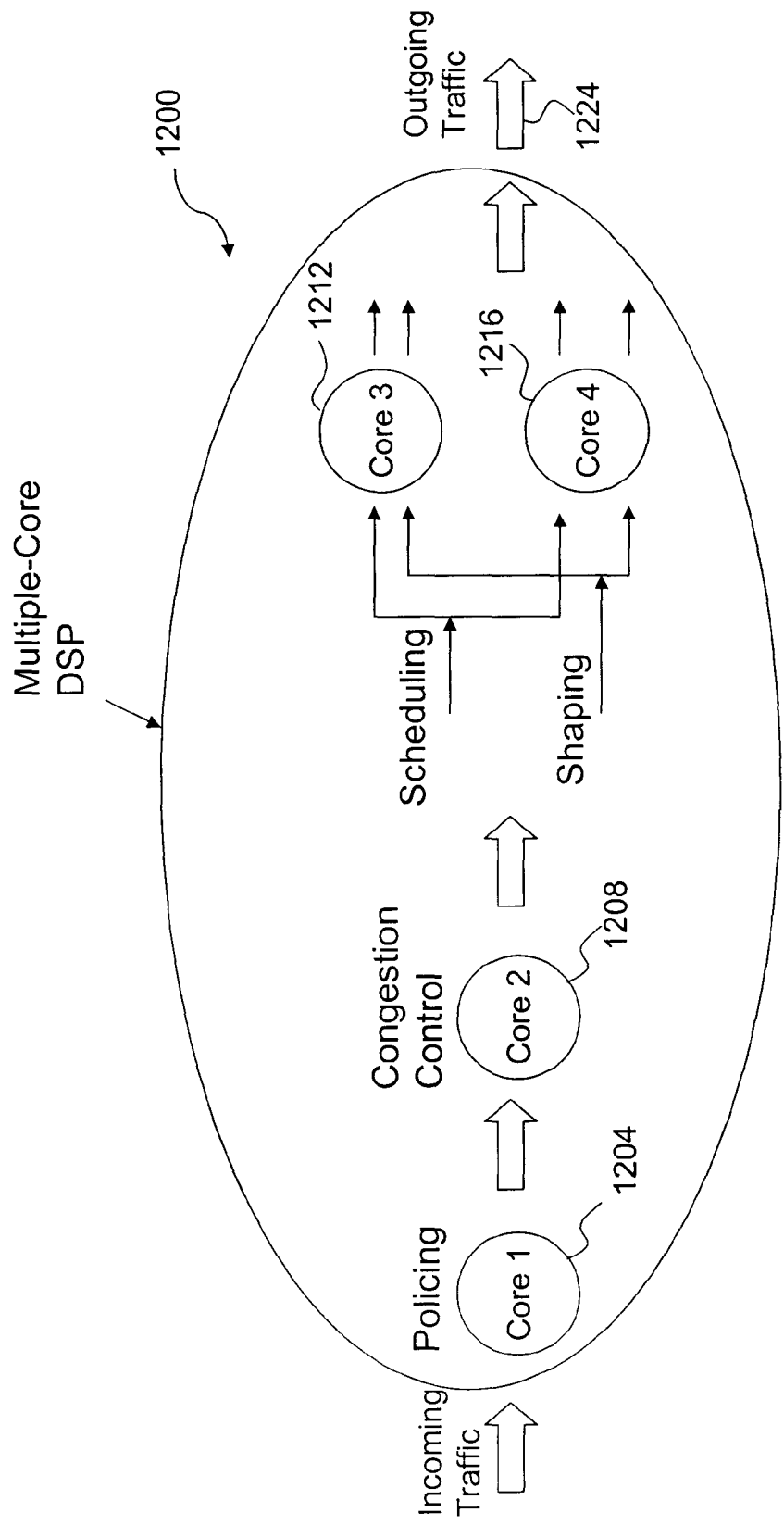
FIG. 12 shows, as an example, an implementation of the traffic management functions in a four core DSP by a mixed pipeline and parallel processing approach according to an embodiment of the invention.

FIG. 12 shows, as an example, an implementation of the traffic management functions in a four core DSP 1200 by a mixed pipeline and parallel processing approach. Core 1204 implements policing, core 1208 implements congestion control, and together core 1212 and core 1216 implement scheduling and shaping in parallel. Core 1204 outputs the incoming data cells and a conforming indicator (e.g., cell loss priority (CLP)=1 for nonconforming cells, CLP=0 for conforming cells) to core 1208. In the congestion event, core 1208 discards the nonconforming cells (e.g., CLP=1). Otherwise, the data cells are sent core 1212 and core 1216. Scheduling and shaping functions are partitioned as task 1 and task 2. In this example, core 1212 performs task 1 for scheduling and shaping functions. Core 1216 performs task 2 for scheduling and shaping functions. If both core 1212 and core 1216 indicate that a data cell is to be outputted, DSP 1200 outputs the data cell.

As an alternative embodiment of the present invention, flows over a network may be managed by the following technique. A class of service memory location, which may be a register of the DSP, is provided. A bit location of the class of service memory location represents a class of service. A first class of service of a first flow is identified. A first bit location in the class of service memory location associated with the first class of service can be set in the class of service memory location. A second class of service of a second flow is identified. The second class of service of the second flow is different from the class of service of the first flow. A second bit location associated with the second class of service can be set. If the second class of service is greater than the first class of service, the second bit location is in a first direction with respect of the first bit location. If the second class of service is less than the first class of service, the second bit location is in a second direction with respect of the first bit location. An instruction of the digital signal processor integrated circuit to determine in the class of service memory location a bit in a first state of the class of service memory location starting from one side of the class of service memory location is executed. The first flow is processed before or after the second flow based on relative locations of the first bit and second bit in the class of service memory location.

In this embodiment, the first state is a 1, but in alternative embodiments the first state can be a 0. Likewise, the first direction is a left direction and the second direction is a right direction, but in alternative embodiments the first direction can be a right direction and the second direction can be a left direction. Executing an instruction of the digital signal processor integrated circuit starts from a left side of the class of service memory location and proceeds in a right direction. However, as an alternative embodiment, executing an instruction of the digital signal processor integrated circuit can start from a right side of the class of service memory location and proceeds in a left direction. The instruction returns an integer representing: a number of consecutive Os from the one side of the class of service memory location, a number of consecutive is from the one side of the class of service memory location, a position of a 1 bit from the one side of the class of service memory location, or a position of a 0 bit from the one side of the class of service memory location. Depending on the embodiment, the instruction may or may not exclude counting a sign bit. These techniques may be implemented in a system that includes a line card with a DSP.

Figure 13:
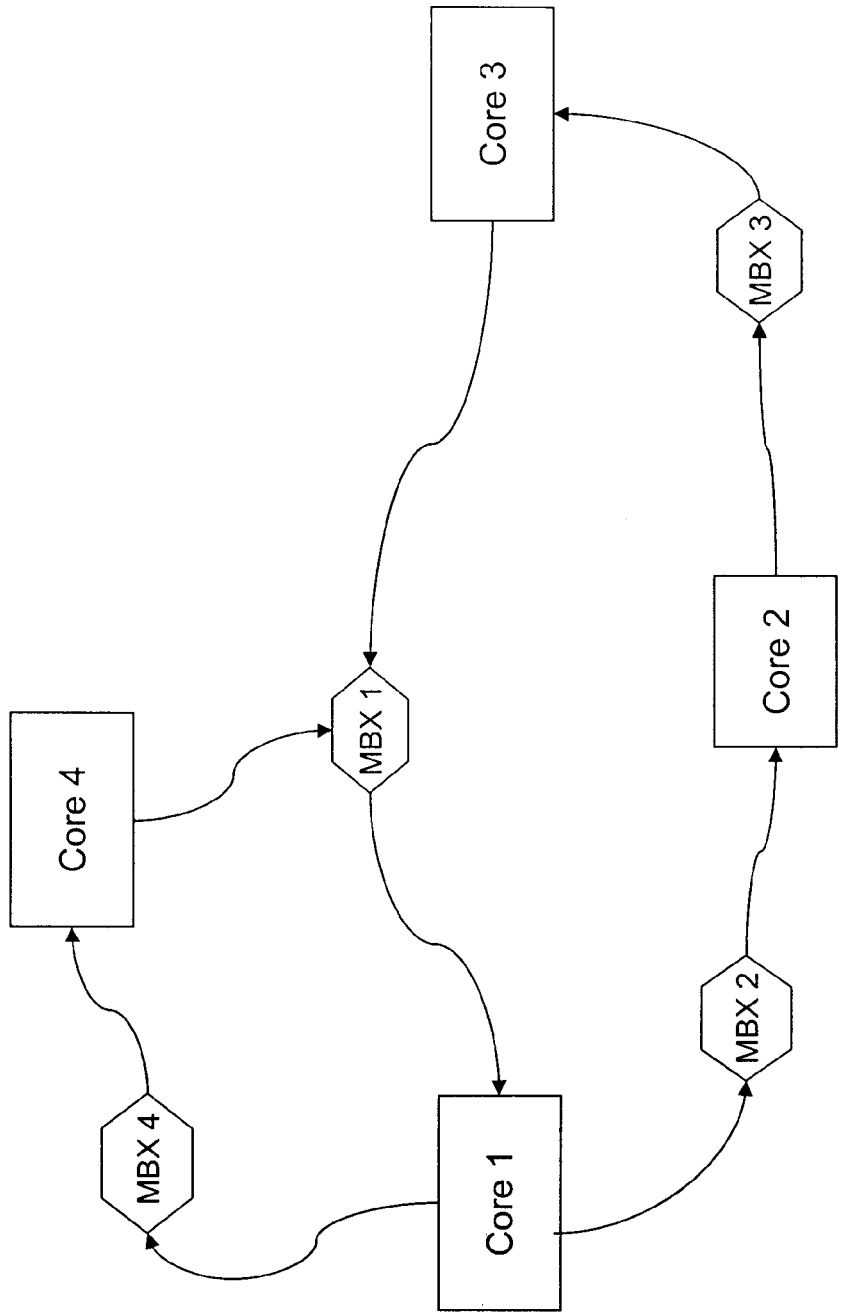
FIG. 13 shows an implementation of using mailboxes to communicate between DSP cores according to an embodiment of the invention.

In an embodiment of this invention with a multicore DSP, such as the Motorola MSC8 102, the DSP-based traffic manager may implement a method of communication between one or more of the plurality of cores. Communication between the plurality of cores can be used by the DSP-based traffic manager to ensure that valid data is available from a particular core before outputting or further processing by the next core. According to an embodiment of the invention, the DSP may use mailboxes (for example, one or more defined memory locations in the on-chip memory of the DSP). FIG. 13 shows an implementation of using mailboxes to communicate between DSP cores. A core may communicate with another core by writing, or reading, data to a corresponding mailbox. In an embodiment of the invention, mailboxes are directly accessible only by corresponding cores. In other embodiments, mailboxes may be directly accessible by all cores.

The mailboxes may be implemented by one or more defined memory locations in the on-chip memory of the DSP.

In alternative embodiments, the mailboxes may be implemented by off-chip memory, such as an SRAM, DRAM, or EEPROM, or even memory not located on the same line card as the DSP. The size of a mailbox may be 32 bits, 64 bits, 128 bits, 256 bits, or larger. In some embodiments of the invention, the mailboxes may be implemented using a pointer memory data structure or link list structure.

Figure 14:
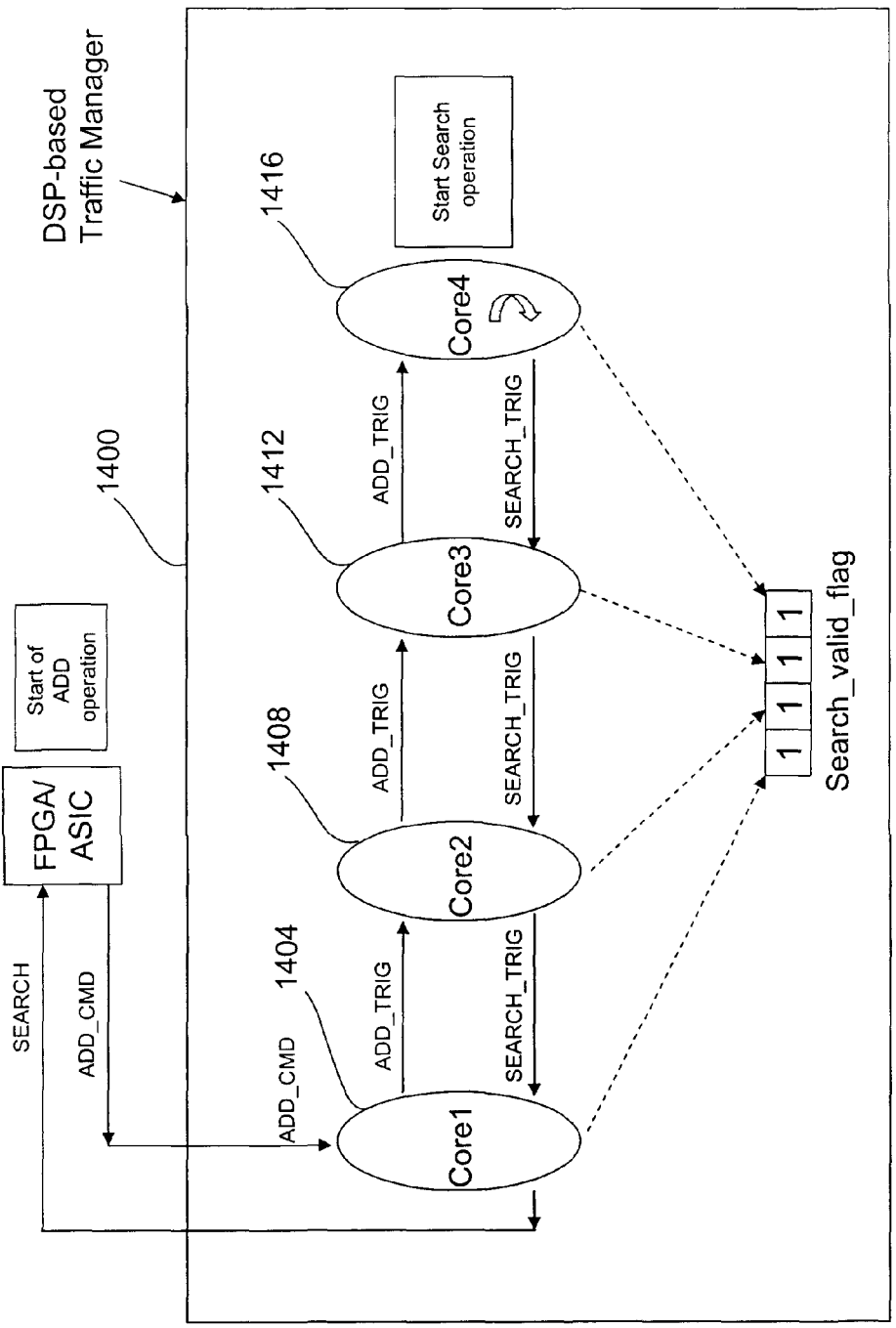
FIG. 14 shows an implementation of using status flags to communicate between DSP cores according to an embodiment of the invention.

In another embodiment of the invention, the DSP may use one or more status flags (for example, an on-chip memory location or register). As an example, FIG. 14 shows an implementation of using status flags to communicate between DSP cores. In the example, the DSP-based traffic manager 1400 use a 4-bit Search_valid_flag to communicate between each core, where:

Search_valid_flag="xxx1," means after search, core 1404 found a valid winner;

Search_valid_flag="xx1x," means after search, core 1408 found a valid winner;

Search_valid_flag="x1xx," means after search, core 1412 found a valid winner; and Search_valid_flag="1xxx," means after search, core 1416 found a valid winner.

Only Search_valid_flag="1111," the search winner flow/packet is valid.

Status flags may be implemented by one or more defined memory locations in the on-chip memory of the DSP. In alternative embodiments, the status flags may be implemented by off-chip memory, such as an SRAM, DRAM, or EEPROM, or even memory not located on the same line card as the DSP. The size of a status flag may be any number of bits, for example 1 to 256 bits (e.g., 1 bit, 2 bits, 3 bits, 4 bits, 32 bits, 64 bits, 128 bits, 256 bits) or larger.

Figure 15:
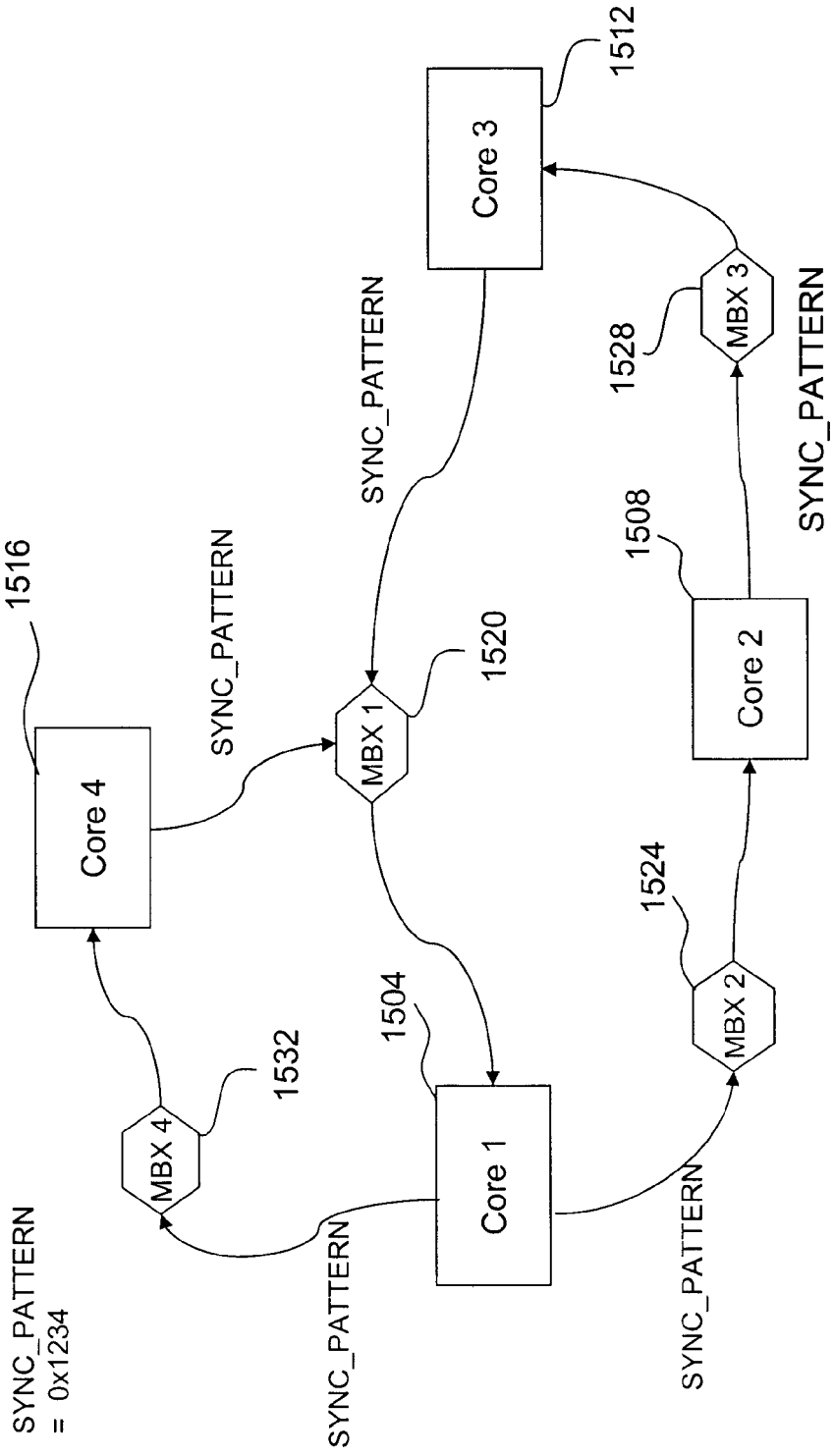
FIG. 15 shows an implementation of using sync_pattern to synchronize cores in a multicore DSP according to an embodiment of the invention.

FIG. 15 shows, as an example, an implementation of using sync_pattern to synchronize cores in a multicore DSP embodiment of the invention. In this example, upon startup, core 1504 sets each mailbox 1520, 1524, 1528, and 1532 to zero. Core 1504 writes a sync_pattern (e.g., 0x1234) to the first word of mailbox 1524 and the first word of mailbox 1532. After which, core 1504 begins polling mailbox 1520. Next, core 1508 copies the first word of mailbox 1524 to the first word of mailbox 1528, and then enters a wait_loop. A wait_loop is perpetual loop until interrupted by an interrupt. Core 1512 then copies the first word of mailbox 1528 to the first word of mailbox 1520, and enters await_loop. Core 1516 copies the first word of mailbox 1532 to the second word of mailbox 1520, and then enters a wait_loop. As soon as core 1504 detects, in our example, the double word 0x12341234 at mailbox 1520, it stops polling mailbox 1520.

As an alternative embodiment of the present invention, flows of a network can be processed by an integrated circuit having a first digital signal processor core and a second digital signal processor core. The first digital signal processor core can execute a first set of instructions on a first flow. A first flag is set to indicate the completion of the first set of instructions. After the first flag is set, the second digital signal processor core can execute a second set of instructions on the first flow. A second flag can indicate the initiation of the second set of instructions on the first flow. After the second flag is set, the first digital signal processor core can execute the first set of instructions on a second flow. After the second set of instructions have completed on the first flow, the first flag may be reset. The first and second flags may be implemented in various ways, including storing the first flag in a first mailbox memory location, storing the second flag in a second mailbox memory location, or storing the first and second flag in a mailbox memory location. These techniques may be implemented by a system that includes a line card with a DSP.

Figure 16:
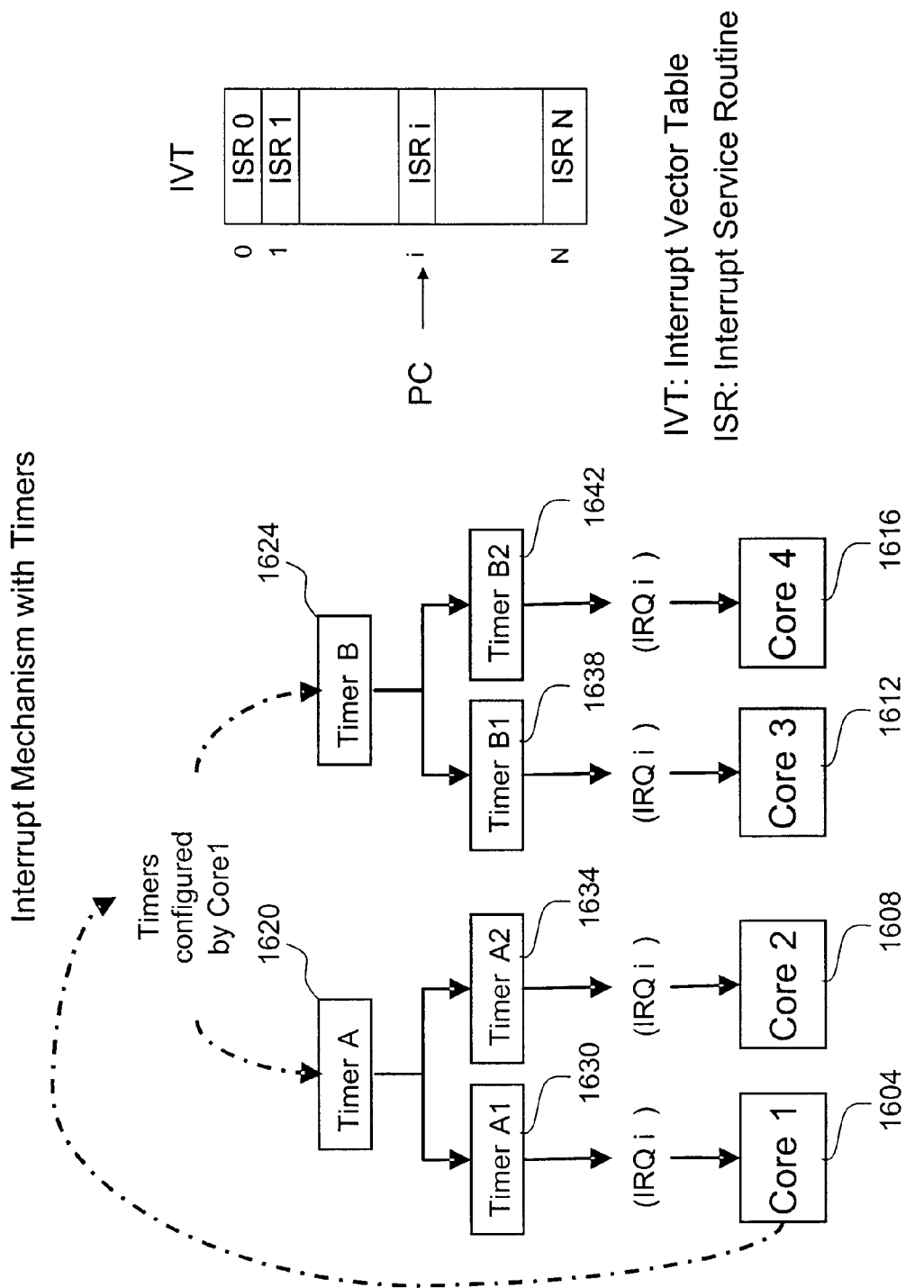
FIG. 16 shows an implementation of timers to generate interrupts to synchronize cores in a multicore DSP according to an embodiment of the invention.

FIG. 16 shows an implementation of timers as interrupts to synchronize cores in a multicore DSP according to an embodiment of the invention. In this example, core 1604 actives a timer mechanism by enabling timer 1620 and timer 1624, and then core 1604 enters a wait_loop. Core 1608, core 1612, and core 1616 are also in a wait_loop. Timer 1620 enables timer 1630 and timer 1634. Timer 1624 enables timer 1638 and timer 1642. Timer 1630 triggers an interrupt IRQi for core 1604, timer 1634 triggers the same interrupt IRQi for core 1608, timer 1638 triggers the same interrupt IRQi for core 1612, and timer 1642 triggers the same interrupt IRQi for core 1616. The program counter (PC) then jumps to the address of interrupt service routine i (ISRi) in the interrupt vector table (1\T1), which is the same for all cores. All cores are now in synchronization mode (i.e., all cores begin to process the same interrupt service routine, ISRi). In this embodiment, the timer 1620 and timer 1624 operate at the same phase and frequency, and timer 1630, timer 1634, timer 1638, and timer 1642 operate at the same phase and frequency. Thus, the core 1604, core 1608, core 1612, and core 1616 operate on the same clock domain. In alternative embodiments, each timer may operate out-of-phase or at a different frequency. As an example, the frequency of timer 1638 may be 1.5×, 2×, 2.5×, 3×, or greater of the frequency of timer 1642.

As an embodiment of the present invention, flows of a network may be processed by an integrated circuit having a first digital signal processor core and a second digital signal processor core. The first digital signal processor core enables a master timer circuit, which in turn enables operation of a first and second timer circuit. The first timer circuit is used to provide a first interrupt to the first digital signal processor core. Similarly, the second timer circuit is used to provide a second interrupt to the second digital signal processor core. The first digital signal processor core and second digital signal processor core can operate in the same clock domain to process a first flow. Alternatively, the step of processing a first flow using the first digital signal processor core and second digital signal processor core operating in the same clock domain can be replaced by processing the first flow using the first digital signal processor core and a second flow using second digital signal processor core operating in the same clock domain. Upon receiving the first interrupt, the first digital signal processor core executes instructions starting at a first memory location. Upon receiving the second interrupt, the second digital signal processor core executes instructions starting at the first memory location. Clocking of the first digital signal processor core and the second digital signal processor core can be at the same phase and frequency. These techniques may be implemented in a system that includes a line card with a DSP.

Figure 17:
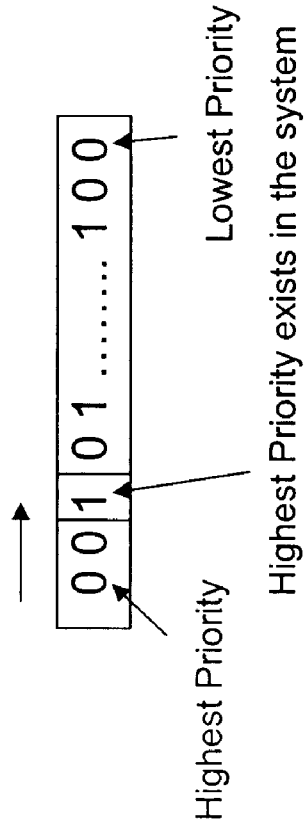
FIG. 17 shows prioritization of incoming flows and packets by searching for the first nonzero bit according to an embodiment of the invention.

A technique for identifying or prioritizing network traffic is depicted in FIG. 17. FIG. 17 shows prioritization of incoming flows and packets by searching for the first nonzero bit according to an embodiment of the invention. In the example of FIG. 17, the bit position of the first nonzero bit from left to right is the third bit, and thus is the highest priority existing in the system. Priority may be based on CoS, including by user, request, or bandwidth, or by time. For example, packets received from premium network customers may be tagged with a higher priority than packets received from other network customers.

Alternatively, timestamps are a specific way to implement priority based on time request. Timestamp value is used to determine traffic delivery sequence. Some discussion of timestamp based techniques are described in U.S. patent application Ser. No. 10/125,686, filed Apr. 17, 2002, issued as U.S. Pat. No. 7,284,111 on Oct. 16, 2007, entitled "Integrated Multidimensional Sorter," and U.S. patent application Ser. No. 10/737,461, filed Dec. 15, 2003, issued as U.S. Pat. No. 7,362,765 on Apr. 22, 2008, entitled "Network Traffic Management System with Floating Point Sorter." Timestamp values may be represented in a number of numbering systems, including binary, octal, decimal, hexadecimal, or floating point format.

Figure 18:
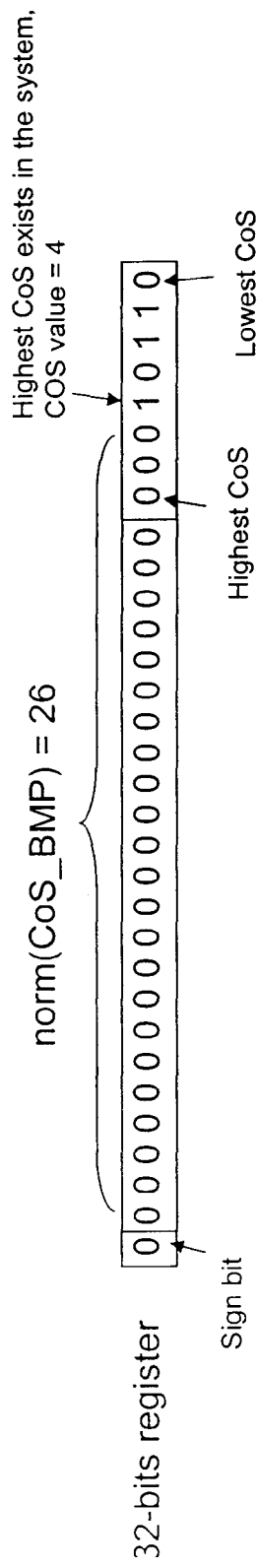
FIG. 18 shows, as an example, an implementation to search for highest class of service using a NORM instruction in Texas Instruments TMS32OC64xx.

To implement a search for the highest class of service, in one embodiment, the NORM instruction in Texas Instruments TMS32OC64xx can be used. NORM is a DSP instruction to calculate the number of redundant zero bits in a 32-bit register, starting from the most significant bit, excluding the sign bit. However, other similar instructions may search from the least significant bit. As an example, in FIG. 18, there are 8 different CoS values in the system. CoS value 0 is the lowest priority and CoS value 7 is the highest. The CoS bitmap is stored in a 32 bit register and CoS values 4, 2, and 1 are active. The value 30 is stored in register A6. The results of the NORM instruction on the 32-bit register, or the value 26, is stored in register AS. The NORM instruction returns a value of 26 as there are 26 redundant zero bits, excluding the sign bit. The DSP-based traffic manager subtracts the value stored in register AS (i.e., 26) from A6 (i.e., 30) to calculate the highest CoS in the system. Thereby, the DSP-based traffic manager may search the CoS bitmap using the NORM instruction to find the highest active CoS in the system, which is 4.

Figure 19:
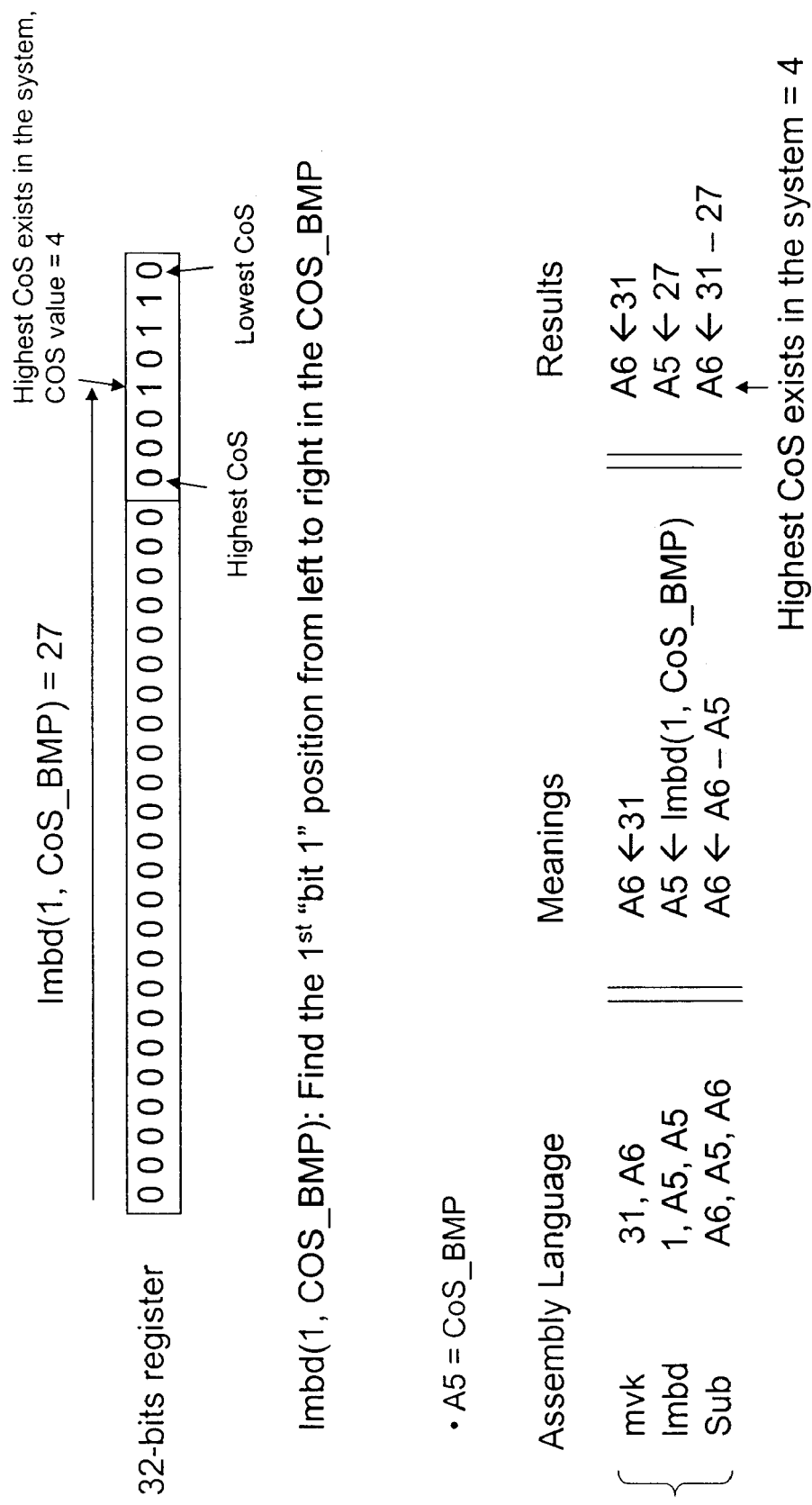
FIG. 19 shows, as an example, an implementation to search for highest class of service using a LMBD instruction in Texas Instruments TMS32OC64xx.

FIG. 19 shows, as an example, an implementation to search for highest class of service using a LMBD instruction in Texas Instruments TMS32OC64xx. LMBD is a DSP instruction to search for the bit position of the first nonzero bit in a 32-bit register, starting from the most significant bit. However, other similar instructions may search from the least significant bit. As an example, in FIG. 19, there are 8 different CoS values in the system. CoS value 0 is the lowest priority and CoS value 7 is the highest. The CoS bitmap is stored in a 32 bit register and CoS values 4, 2, and 1 are active. The value 31 is stored in register A6. The results of the LMBD instruction on the 32-bit register, or the value 27, is stored in register AS. The LMBD instruction returns a value of 27 as the bit position of the first nonzero bit in the 32-bit register. The DSP-based traffic manager subtracts the value stored in register AS (i.e., 27) from A6 (i.e., 31) to calculate the highest CoS in the system. Thereby, the DSP-based traffic manager may search the CoS bitmap using the LMBD instruction to find the highest active CoS in the system, which is 4.

Figure 20:
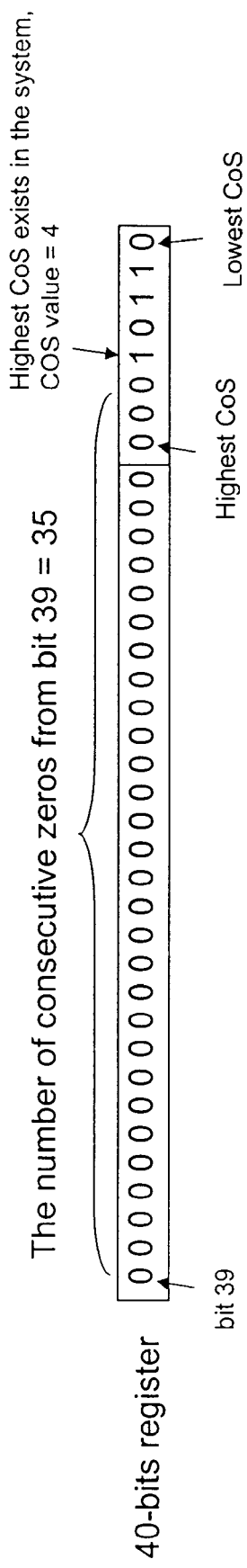
FIG. 20 shows, as an example, an implementation to search for highest class of service using a CLB instruction in Motorola MSC8 102.
Figure 20:
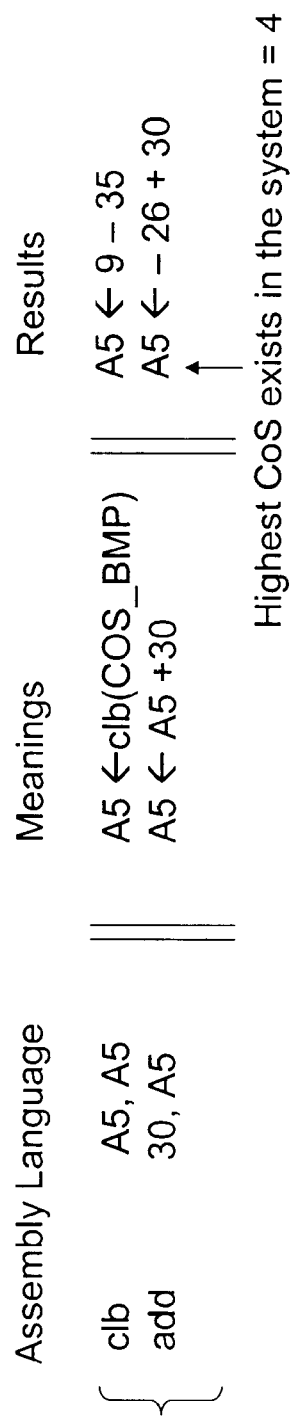

FIG. 20 shows, as an example, an implementation to search for highest class of service using a CLB instruction in Motorola MSC8 102. CLB is a DSP instruction that uses a fix value, 9, to subtract the number of consecutive zero bits from the most significant bit (e.g., bit 39). However, other similar instructions may search from the least significant bit. As an example, in FIG. 20, there are 8 different CoS values in the system. CoS value 0 is the lowest priority and CoS value 7 is the highest. The CoS bitmap is stored in a 40 bit register and CoS values 4, 2, and 1 are active. The results of the CLB instruction on the 40-bit register, or the value 26, is stored in register AS. The CLB instruction returns a value of 26 since it equals the difference of the fixed value 9 and 3S, the number of consecutive zeros from the most significant bit. The DSP-based traffic manager adds the value 30 to the value stored in register AS to calculate the highest CoS in the system. Thereby, the DSP-based traffic manager may search the CoS bitmap using the CLB instruction to find the highest active CoS in the system, which is 4.

Figure 21:
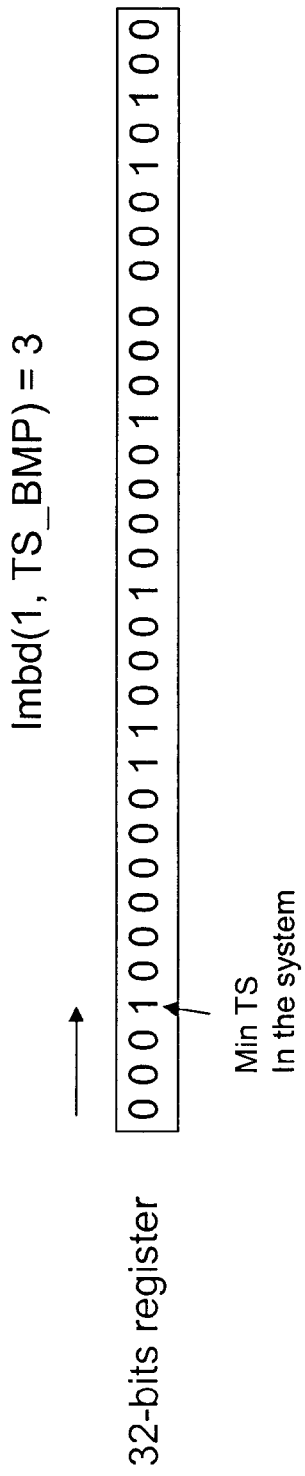
FIG. 21 shows, as an example, an implementation to search for the minimum timestamp value a LMBD instruction in Texas Instruments TMS32OC64xx.
Figure 21:

In an embodiment, to implement a search for the lowest timestamp, the LMBD instruction in Texas Instruments TMS32OC64xx can be used. As an example, FIG. 21 shows, an implementation to search for the minimum timestamp value using the LMBD instruction. The DSP-based traffic manager finds the first nonzero bit position within the 32 bit register using the LMBD instruction. In the example, the LMBD instruction saves the value 3, the first nonzero bit position and also the minimum timestamp value, to register AS.

In an embodiment of the invention, the on-chip memory of a traffic manager DSP is 128K bytes, 256K bytes, S12K bytes, 1 M bytes, or greater. The on-chip memory may be used for program code, data, stack, interrupt vector table, mailboxes, or status flags. At least 32K bytes and 4K bytes can be allocated to program code and stack, respectively, to improve the efficiency of traffic management by the DSP. Memory size will influence the number of networking flows or connections that the traffic manager DSP can handle. For anticipated networking applications, it is expected that on-chip memory of at least 128K bytes would be need to quickly handle the probable number of flows. As a simplistic example, if a traffic manager DSP is to handle 8000 flows, on-chip memory usage can be allocated per flow as follows:

2 bytes can be allocated for peak cell rate;
2 bytes for guarantee cell rate;
2 bytes for control burst parameters (e.g., cell delay variation tolerance (CD\T1) or burst tolerance (BT) in leaky bucket scheme);
2 bytes for eligible departure time (for shaping purpose);
2 bytes for receive cell count (to count how many cells received from that flow for billing purpose);
2 bytes for drop cell count (to count how many cells from that flow is dropped by congestion control);
2 bytes for queue length count (to count how many cells from that flow in the system); and
2 bytes for setting threshold value in congestion control (e.g., if queue length count exceeds that threshold, all incoming cells from that flow will be dropped).

Therefore, in this example, the traffic manager DSP would require at least 128K bytes of on-chip memory (8000 flows× 16 bytes per flow). As alternative embodiment with 16,000 flows, the traffic manage DSP should have at least 128K bytes of on-chip memory (16,000 flows×16 bytes per flow).

In alternative embodiments, off-chip memory can be used instead of on-chip memory. However, on-chip memory use is more efficient, since the DSP's internal logic can access (read or write) on-chip memory through a very wide, internal bus (e.g., 128 bits to S12 bits). Access to off-chip memory is normally 16 bits to 64 bits. Therefore, read or write times for off-chip memory is significantly slower (e.g., about 2 to 32 times slower) than for on-chip memory.

On-chip memory for a DSP is typically volatile memory. As a result, the traffic management system program may need to be loaded to on-chip memory upon startup. The traffic management system program can be resident on off-chip memory (e.g., flash memory). However, in order to upgrade the traffic management system program, the off-chip memory may need to be updated. In alternative embodiments, the on-chip memory may be nonvolatile memory.

In an embodiment of the invention, the DSP's circular buffer is an important feature. The circular buffer is a designated portion of the on-chip memory of the DSP with fixed length, for example, N bytes. A DSP with a circular buffer automatically increments address pointers which wrap to the beginning of the circular buffer when its end is reached, thus saving the time and instructions otherwise needed to ensure that the address pointers stay within the boundary of the circular buffer. The circular buffer can be used, for example, with the shaping function of traffic management.

Figure 22:
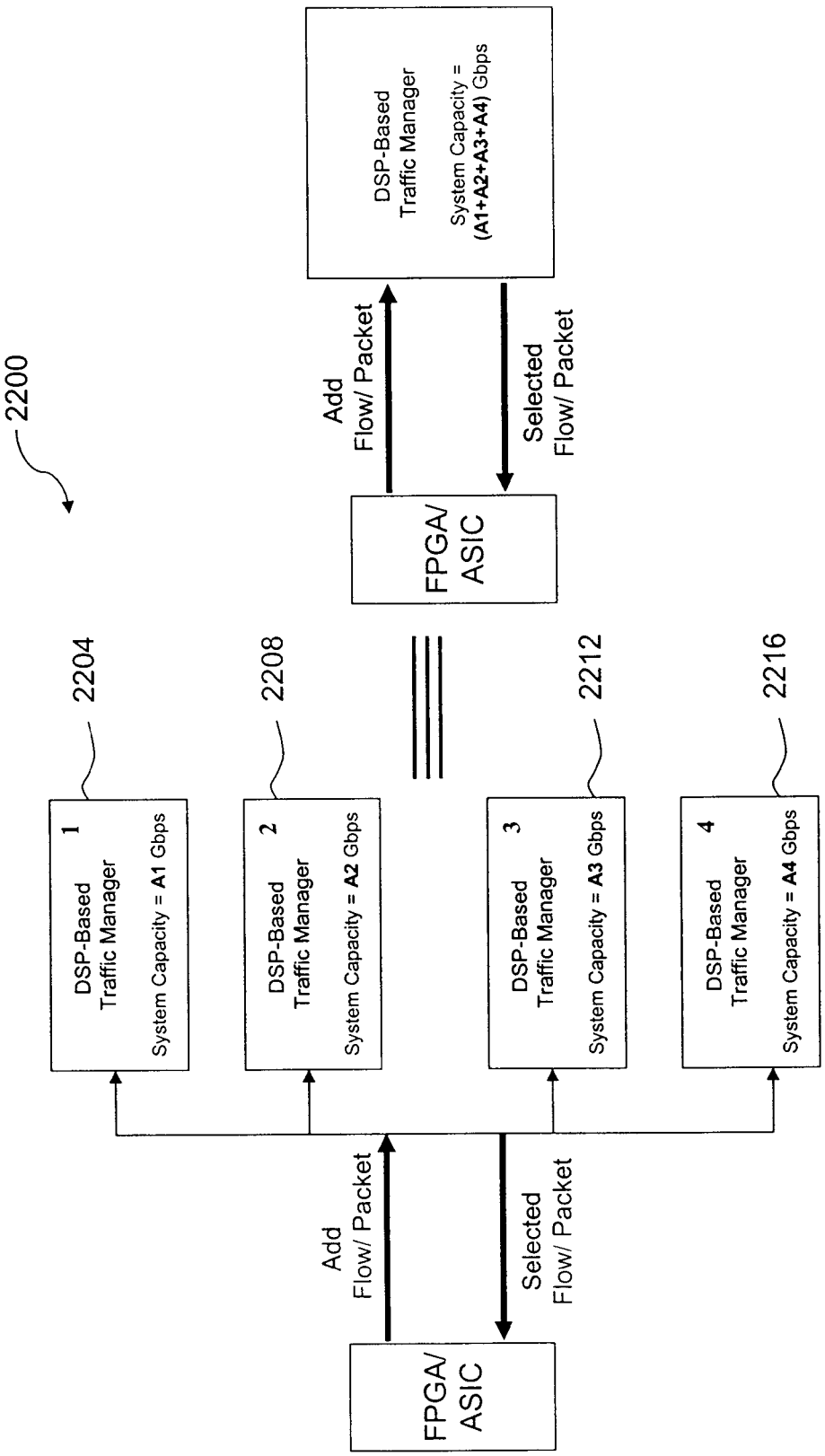
FIG. 22 shows, as an embodiment of the invention, the use of a plurality of DSPs as a traffic manager to increase capacity.

FIG. 22 shows, as an embodiment of the invention, the use of a number of DSPs as a traffic manager to increase capacity (i.e., scalability). The system capacity of traffic manager 2200 is the sum of the capacities of DSP 2204, DSP 2208, DSP 2212, and DSP 2216. Depending on the specific application, for cost reduction, it may be more preferable to use DSP 2204, DSP 2208, DSP 2212, and DSP 2216 in lieu of a single DSP with the same capacity. In embodiments of a traffic manager, the traffic manager may use one, two, three, four, five, six, seven, eight or more DSPs. These DSPs may be on one line card or on multiple line cards, including individual line cards for each DSP. Another advantage of implementations with multiple DSPs is, in the event of failure of a DSP, tasks can be redistributed or switched to one or more of the other DSPs.

An embodiment of the invention includes techniques for removing the traffic management chip (ASIC or FPGA) from the board or socket of an existing line card and replacing with a DSP. Replacing the traffic management chip (ASIC or FPGA) with a DSP provides advantages, including improved processing speed, reduced power consumption, and reduced heat generation.

In a specific implementation, a method of managing traffic over a network includes receiving incoming traffic from the network in a digital signal processing integrated circuit having at least 128K bytes of on-chip memory, performing a policing function on the incoming traffic to the digital signal processing integrated circuit in a first core of the digital signal processing integrated circuit, performing a congestion control function in a second core of the digital signal processing integrated circuit, where the second core processes data generated by the first core, performing a scheduling function in a third core of the digital signal processing integrated circuit, where the third core processes data generated by the second core, and performing a shaping function in a fourth core of the digital signal processing integrated circuit, where the fourth core processes data generated by the third core.

In a specific implementation, a method of managing traffic over a network includes receiving incoming traffic from the network in a digital signal processing integrated circuit having at least 128K bytes of on-chip memory, performing a first traffic management function on the incoming traffic to the digital signal processing integrated circuit in a first core of the digital signal processing integrated circuit, and performing a second traffic management function in a second core of the digital signal processing integrated circuit, where the second core processes data generated by the first core.

A traffic management function may include sorting the traffic by class of service, policing traffic to not exceed boundary of a bandwidth of the channel, and scheduling traffic.

The scheduling traffic may be based on priority queuing, first in first out queuing, class based queuing, round robin, waiting round robin, earlier deadline first, weighted fair queue, deficit round robin, or modified deficit round robin. There may be no direct communication path between the first core and the second core. The data generated by the first core may be passed to the second core using a mailbox. The first core and second core may be synchronized using an interrupt mechanism with a plurality of timers.

In a specific implementation, a method of managing traffic over a network includes receiving incoming traffic from the network in a digital signal processing integrated circuit having at least 128K bytes of on-chip memory, performing a first portion a traffic management function on the incoming traffic to the digital signal processing integrated circuit in a first core of the digital signal processing integrated circuit, and performing a second portion the traffic management function on the incoming traffic to the digital signal processing integrated circuit in a second core of the digital signal processing integrated circuit, where the first and second portions of the traffic management function are performed in parallel by the first and second cores of the digital signal processing integrated circuit.

In a specific implementation, a method of managing traffic over a network includes receiving incoming traffic from the network in a digital signal processing integrated circuit having at least 128K bytes of on-chip memory, performing a first traffic management function on the incoming traffic to the digital signal processing integrated circuit in a first core of the digital signal processing integrated circuit, performing a first portion of a second traffic management function in a second core of the digital signal processing integrated circuit, where the second core processes data generated by the first core, and performing a second portion of the second traffic management function in a third core of the digital signal processing integrated circuit, where the first and second portions of the second traffic management function are performed in parallel by the second and third cores of the digital signal processing integrated circuit.

In a specific implementation, a system includes a network processor receiving incoming flows from a network, a digital signal processing integrated circuit, connected to the network processor, having at least 128K bytes of on-chip memory, where the digital signal processing integrated circuit receives a first flow and a second flow of incoming traffic from the network processor, and the digital signal processing integrated circuit communicates to the network processor which of the first flow or second flow is to be processed next.

The on-chip memory may have at least 256K bytes of on-chip memory, at least S12K bytes of on-chip memory, or at least 1 megabyte of on-chip memory. The digital signal processing integrated circuit may consume less than about 2.0 watts. The digital signal processing integrated circuit may have less the about S32 pins, or less than about 6S0 pins.

In a specific implementation, a method of managing traffic over a network includes receiving incoming traffic from the network in a digital signal processing integrated circuit having at least 128K bytes of on-chip memory, performing traffic management function for a first layer of the network using a first core of the digital signal processing integrated circuit, and performing traffic management function for a second layer of the network using a second core of the digital signal processing integrated circuit.

In a specific implementation, a system includes a set of incoming flows and a set of connections, a network processor receiving the incoming flows and capable of linking one of the incoming flow to one of the connections, and a digital signal processing integrated circuit, connected to the network processor, where the digital signal processing integrated circuit selects one of the sets of flows and instructs the network processor to connect a selected flow to a first connection, the digital signal processing integrated circuit includes a first core managing a first layer of traffic management of the incoming flows from the network processor, a second core managing a second layer of traffic management of the incoming flows from the network processor, and a set of bits to communicate between layers of the first core and the second core.

In a specific implementation, a method of managing flows over a network includes providing a class of service memory location, where a bit location of the class of service memory location represents a class of service, identifying a first class of service of a first flow, setting a first bit location in the class of service memory location associated with the first class of service in the class of service memory location, identifying a second class of service of a second flow, where the second class of service of the second flow is different from the class of service of the first flow, setting a second bit location associated with the second class of service, where when the second class of service is greater than the first class of service, the second bit location is in a first direction with respect of the first bit location, and when the second class of service is less than the first class of service, the second bit location is in a second direction with respect of the first bit location, executing an instruction of the digital signal processor integrated circuit to determine in the class of service memory location a bit in a first state of the class of service memory location starting from one side of the class of service memory location, and processing the first flow before or after the second flow based on relative locations of the first bit and second bit in the class of service memory location.

The first state may be a 1. The first state may be a 0. The first direction may be a left direction and the second direction may be a right direction. The first direction may be a right direction and the second direction may be a left direction. In an implementation, executing an instruction of the digital signal processor integrated circuit starts from a left side of the class of service memory location and proceeds in a right direction.

In another implementation, executing an instruction of the digital signal processor integrated circuit starts from a right side of the class of service memory location and proceeds in a left direction. The class of service memory location may be a register of the digital signal processor integrated circuit.

The instruction may return an integer representing a number of consecutive Os from the one side of the class of service memory location. The instruction may exclude counting a sign bit. In an implementation, the instruction returns an integer representing a number of consecutive is from the one side of the class of service memory location. In another implementation, the instruction returns an integer representing a position of a 1 bit from the one side of the class of service memory location. In another implementation, the instruction returns an integer representing a position of a 0 bit from the one side of the class of service memory location.

In a specific implementation, a system includes a line card, having a digital signal processor integrated circuit, operating using a method described above.

In a specific implementation, a method of processing flows of a network includes providing an integrated circuit having a first digital signal processor core and a second digital signal processor core, executing in the first digital signal processor core a first set of instructions on a first flow, setting a first flag to indicate the completion of the first set of instructions, and after the first flag is set, executing in the second digital signal processor core a second set of instructions on the first flow.

The method may further include setting a second flag to indicate the initiation of the second set of instructions on the first flow. In an implementation, after the second flag is set, the method includes executing in the first digital signal processor core the first set of instructions on a second flow. The method may further include after the second set of instructions have completed on the first flow, resetting the first flag.

The second flag may be stored in second mailbox memory location. The first and second flags may be stored in a mailbox memory location. The first flag may be stored in a first mailbox memory location.

In a specific implementation, a system includes a line card, having a digital signal processor integrated circuit, operating using a method described above.

In a specific implementation, a method of processing flows of a network includes providing an integrated circuit having a first digital signal processor core and a second digital signal processor core, using the first digital signal processor core to enable a master timer circuit, where the master timer circuit enables operation of a first and second timer circuits, providing a first interrupt to the first digital signal processor core using the first timer circuit, providing a second interrupt to the second digital signal processor core using the second timer circuit, and processing a first flow using the first digital signal processor core and second digital signal processor core operating in the same clock domain.

The step of processing a first flow using the first digital signal processor core and second digital signal processor core operating in the same clock domain may be replaced by processing a first flow using the first digital signal processor core and a second flow using second digital signal processor core operating in the same clock domain. In an implementation, the first digital signal processor core and second digital signal processor core operation at using clocking having the same phase and frequency.

In a specific implementation, the method includes upon receiving the first interrupt, executing in the first digital signal processor core instructions starting at a first memory location; and upon receiving the second interrupt, executing in the second digital signal processor core instructions starting at the first memory location.

In a specific implementation, a system includes a line card, having a digital signal processor integrated circuit, operating using a method described above.

In a specific implementation, a network management system includes a backplane, a first card, connected to the backplane, including a first digital signal processor integrated circuit to process packet flows of the network management system directed to the first card, and a second card, connected to the backplane, including a second digital signal processor integrated circuit to process packet flows of the network management system directed to the second card, where the backplane provides a communication path between the first and second card.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of operating a digital signal processing integrated circuit comprising:
receiving an entry comprising a binary time stamp having at least four bits and a data value through at least a first pin of the digital signal processing integrated circuit, wherein the digital signal processing integrated circuit comprises at least 128K bytes of on-chip memory, in which the first pointer memory structure is implemented;
providing a first pointer memory structure, implemented in the digital signal processing integrated circuit and referenced using a first pointer address and having a head and a body, wherein the head comprises a bit map field comprising four bits and the body comprises four memory positions, each bit in the bit map field representing one of the four memory positions;

initializing the four bits of the head of the first pointer memory structure to a first state;

when storing a second pointer address in a first memory position of the four memory positions, changing a first bit of the four bits of the head of the first pointer memory structure to a second state;

when storing the second pointer address in a second memory position of the four memory positions, changing a second bit of the four bits of the head of the first pointer memory structure to the second state;

when storing the second pointer address in a third memory position of the four memory positions, changing a third bit of the four bits of the head of the first pointer memory structure to the second state; and when storing the second pointer address in a fourth memory position of the four memory positions, changing a fourth bit of the four bits of the head of the first pointer memory structure to the second state, wherein an address added to a value in the bit map field will reference a memory position where the second pointer address is stored, and dividing the binary time stamp into a first time stamp portion having at least two bits and second time stamp portion having at least two bits.

2. The method of claim 1 wherein when the first time stamp portion is 00, store in the first memory position, when the first time stamp portion is "01," store in the second memory position, when the first time stamp portion is "10," store in the third memory position, and when the first time stamp portion is "11," store in the fourth memory position.

3. The method of claim 2 comprising:

storing the second pointer address in the first, second, third, or fourth memory position based on the first time stamp portion.

4. The method of claim 1 wherein the second pointer address points to a second pointer memory structure, having a head and a body, wherein the head comprises a bit map field comprising four bits and the body comprises four memory positions, each bit in the bit map field represents one of the four memory positions, and the method further comprises:

when storing a third pointer address in a first memory position of the four memory positions of the second pointer memory structure, changing a first bit of the four bits of the head of the second pointer memory structure to a second state;

when storing the third pointer address in a second memory position of the four memory positions of the second pointer memory structure, changing a second bit of the four bits of the head of the second pointer memory structure to the second state;

when storing the third pointer address in a third memory position of the four memory positions of the second pointer memory structure, changing a third bit of the four bits of the head of the second pointer memory structure to the second state; and when storing the third pointer address in a fourth memory position of the four memory positions of the second pointer memory structure, changing a fourth bit of the four bits of the head of the second pointer memory structure to the second state.

5. The method of claim 4 comprising:

storing the second pointer address in the first, second, third, or fourth memory position based on the first time stamp portion.

6. A method of operating a digital signal processing integrated circuit comprising:

receiving an entry comprising a binary time stamp having at least four bits and a data value through at least a first pin of the digital signal processing integrated circuit, wherein the digital signal processing integrated circuit comprises at least 128K bytes of on-chip memory, in which the first pointer memory structure is implemented;

providing a first pointer memory structure, implemented in the digital signal processing integrated circuit and referenced using a first pointer address and having a head and a body, wherein the head comprises a bit map field comprising four bits and the body comprises four memory positions, each bit in the bit map field representing one of the four memory positions;

initializing the four bits of the head of the first pointer memory structure to a first state;

when storing a second pointer address in a first memory position of the four memory positions, changing a first bit of the four bits of the head of the first pointer memory structure to a second state;

when storing the second pointer address in a second memory position of the four memory positions, changing a second bit of the four bits of the head of the first pointer memory structure to the second state;

when storing the second pointer address in a third memory position of the four memory positions, changing a third bit of the four bits of the head of the first pointer memory structure to the second state;

when storing the second pointer address in a fourth memory position of the four memory positions, changing a fourth bit of the four bits of the head of the first pointer memory structure to the second state, wherein an address added to a value in the bit map field will reference a memory position where the second pointer address is stored;

dividing the binary time stamp into a first time stamp portion having at least two bits and second time stamp portion having at least two bits; and storing the second pointer address in the first, second, third, or fourth memory position based on the first time stamp portion.

7. The method of claim 6 wherein when the first time stamp portion is 00, store in the first memory position, when the first time stamp portion is "01," store in the second memory position, when the first time stamp portion is "10," store in the third memory position, and when the first time stamp portion is "11," store in the fourth memory position.

8. The method of claim 6 wherein the second pointer address points to a second pointer memory structure, having a head and a body, wherein the head comprises a bit map field comprising four bits and the body comprises four memory positions, each bit in the bit map field represents one of the four memory positions, and the method further comprises:

when storing a third pointer address in a first memory position of the four memory positions of the second pointer memory structure, changing a first bit of the four bits of the head of the second pointer memory structure to a second state;

when storing the third pointer address in a second memory position of the four memory positions of the second pointer memory structure, changing a second bit of the four bits of the head of the second pointer memory structure to the second state;

when storing the third pointer address in a third memory position of the four memory positions of the second pointer memory structure, changing a third bit of the four bits of the head of the second pointer memory structure to the second state; and when storing the third pointer address in a fourth memory position of the four memory positions of the second pointer memory structure, changing a fourth bit of the four bits of the head of the second pointer memory structure to the second state.

\* \* \* \* \*